Aug. 29, 1961 C. BAMFORD ET AL 2,998,039
MACHINE FOR JOINTING AND GLUING BUNDLES OF VENEER STRIPS
Filed April 16, 1959 9 Sheets-Sheet 1

INVENTORS.
Calvin Bamford
BY Mayo S. Prentice
Fred C. Matheny
ATTORNEY.

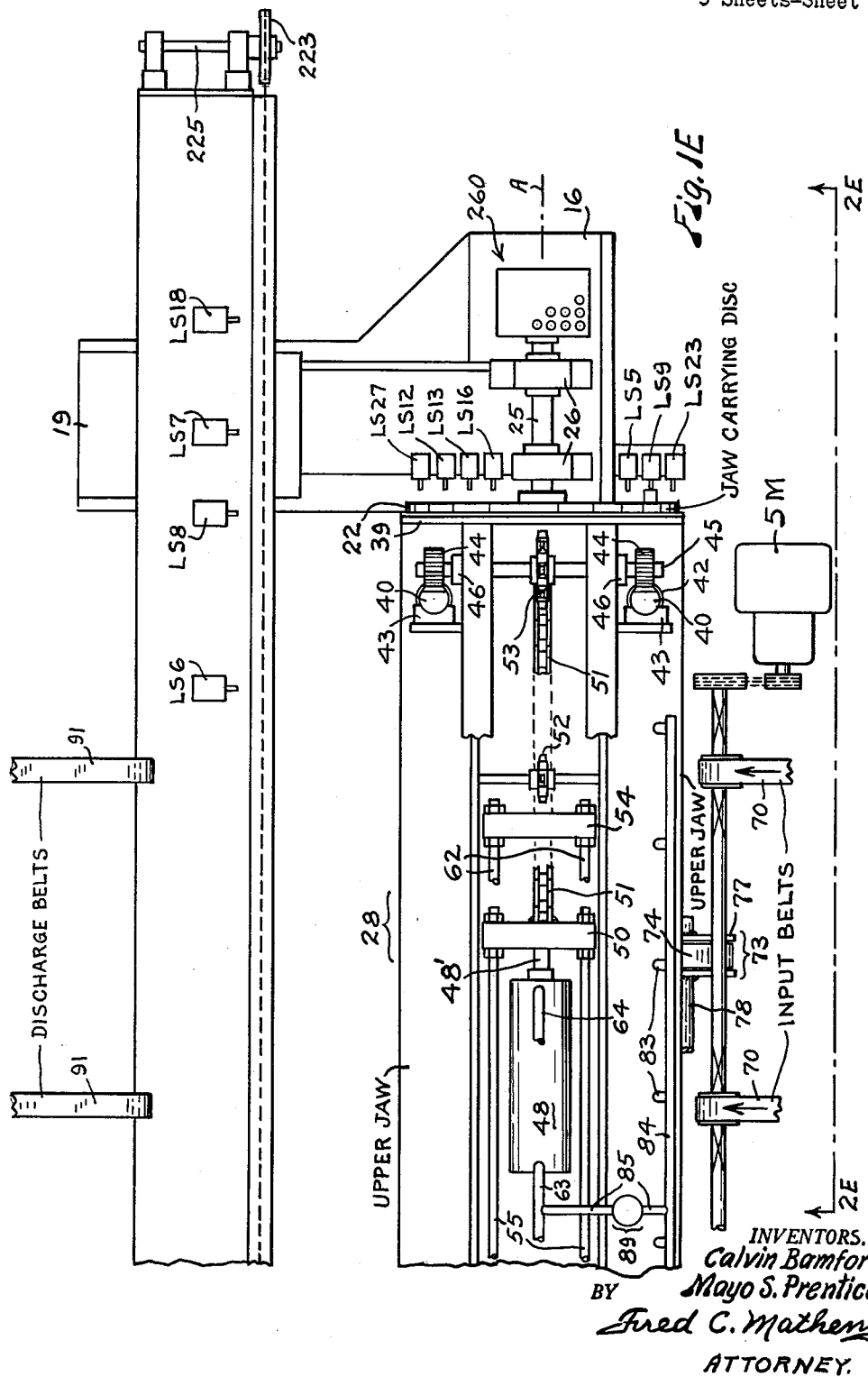

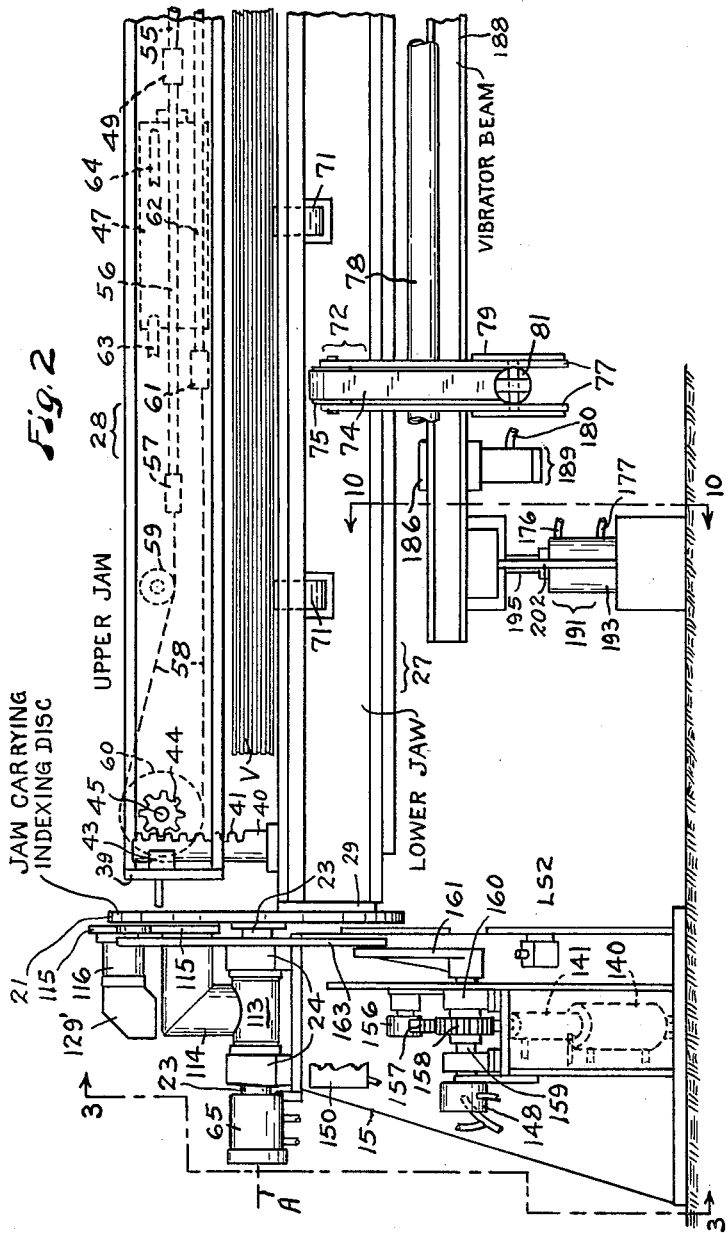

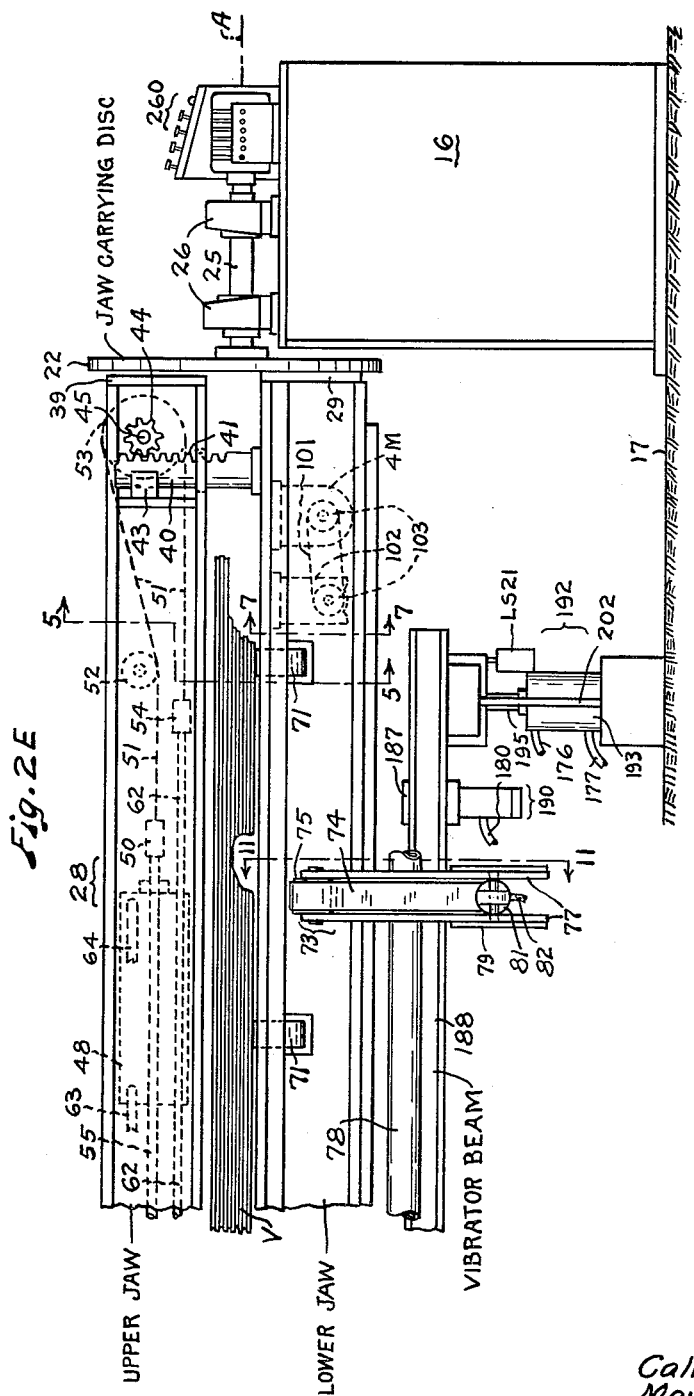

Aug. 29, 1961 C. BAMFORD ET AL 2,998,039
MACHINE FOR JOINTING AND GLUING BUNDLES OF VENEER STRIPS
Filed April 16, 1959 9 Sheets-Sheet 5
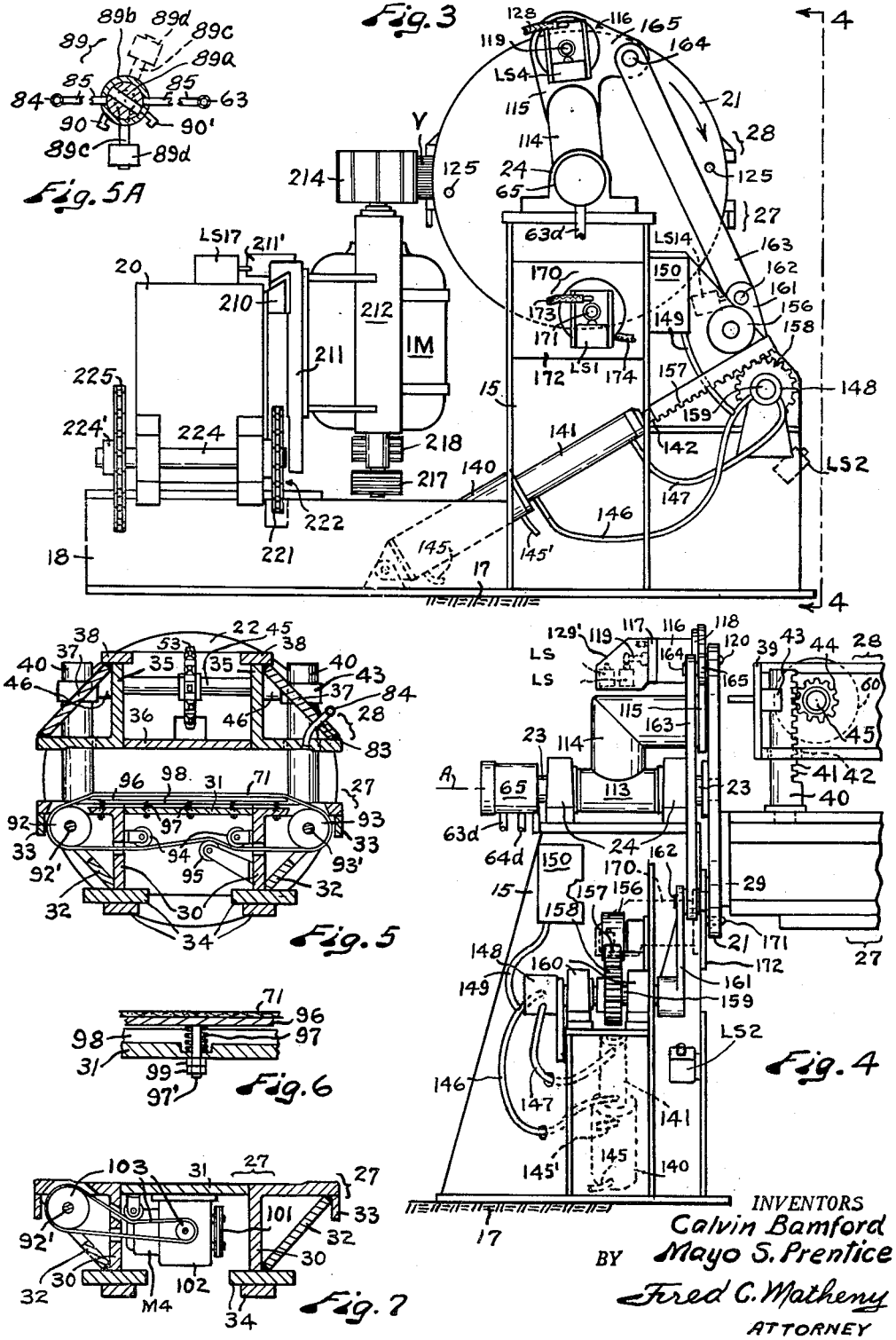
INVENTORS
Calvin Bamford
Mayo S. Prentice
BY
Fred C. Matheny
ATTORNEY Aug. 29, 1961   C. BAMFORD ET AL   2,998,039
MACHINE FOR JOINTING AND GLUING BUNDLES OF VENEER STRIPS
Filed April 16, 1959   9 Sheets-Sheet 6
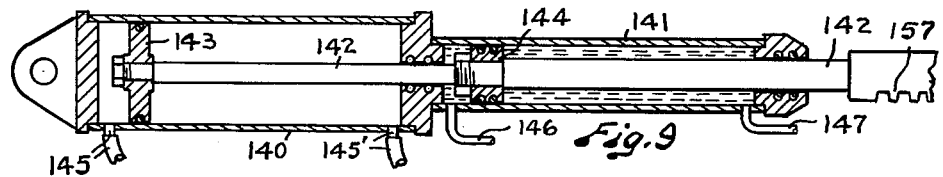
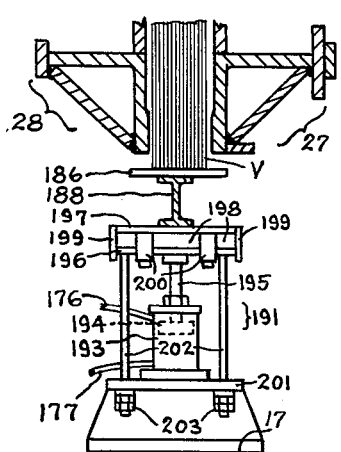
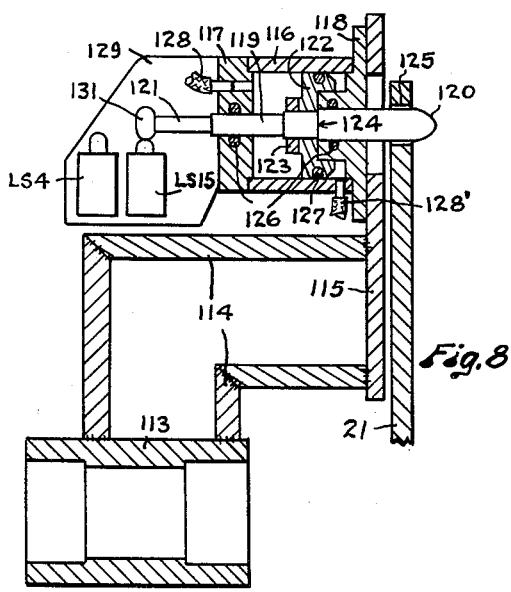
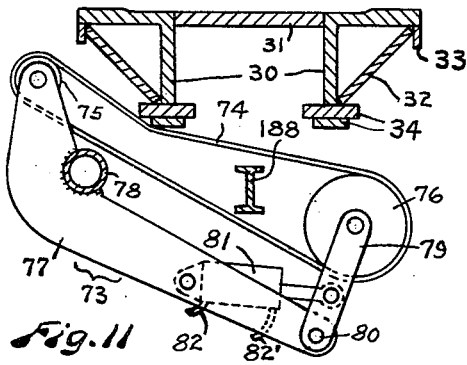
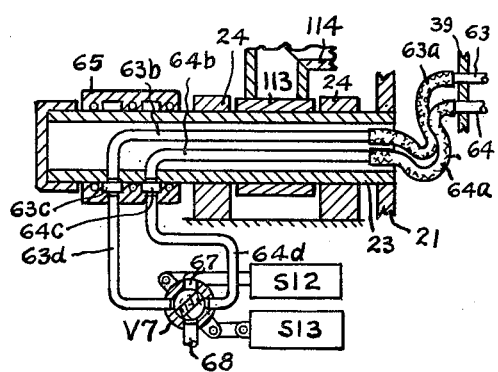
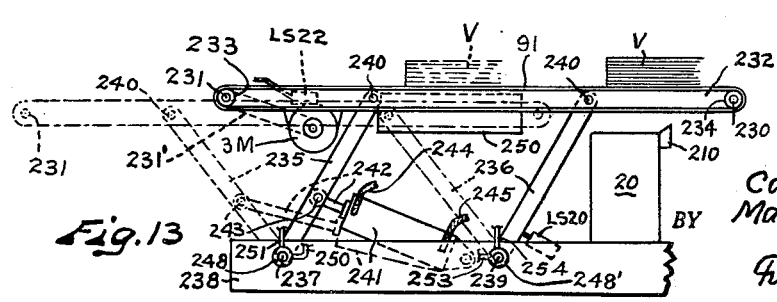
INVENTORS.
Calvin Bamford
Mayo S. Prentice
BY Fred C. Matheny
ATTORNEY

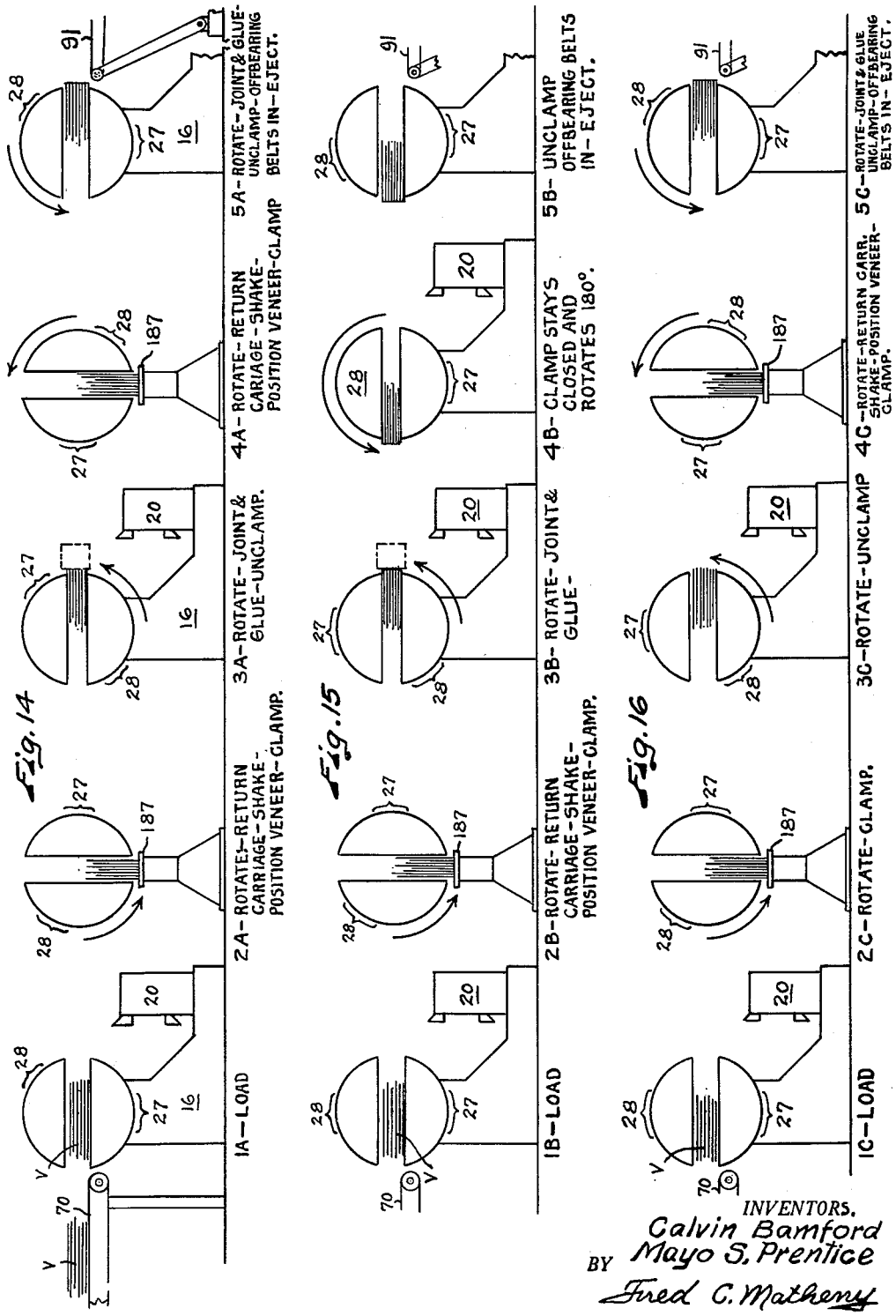

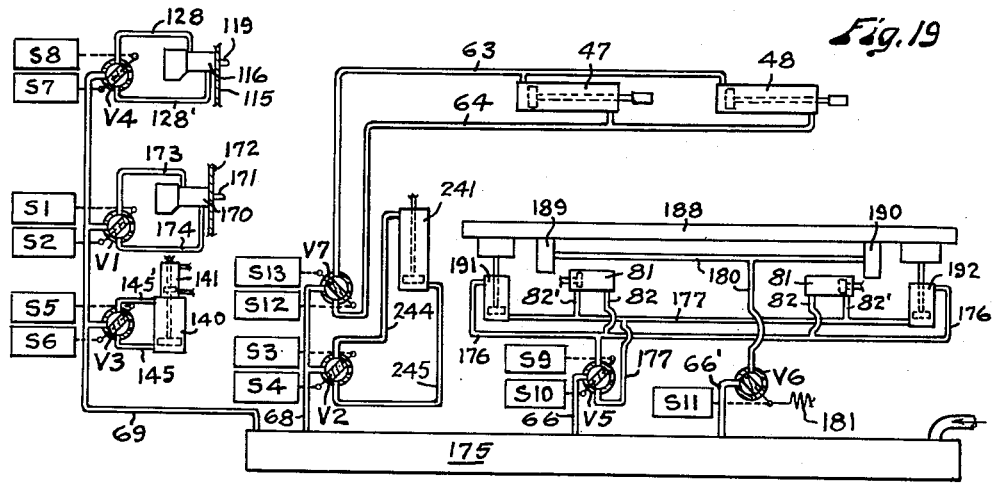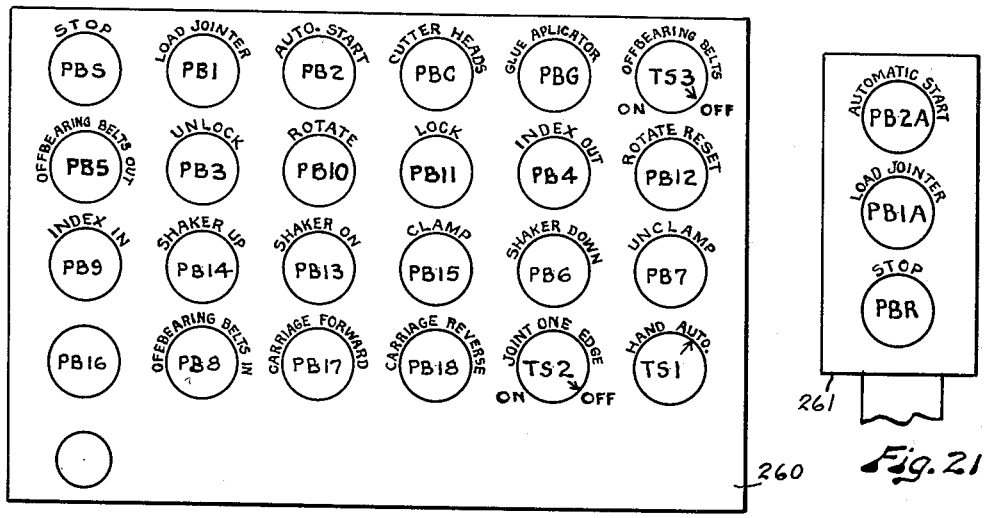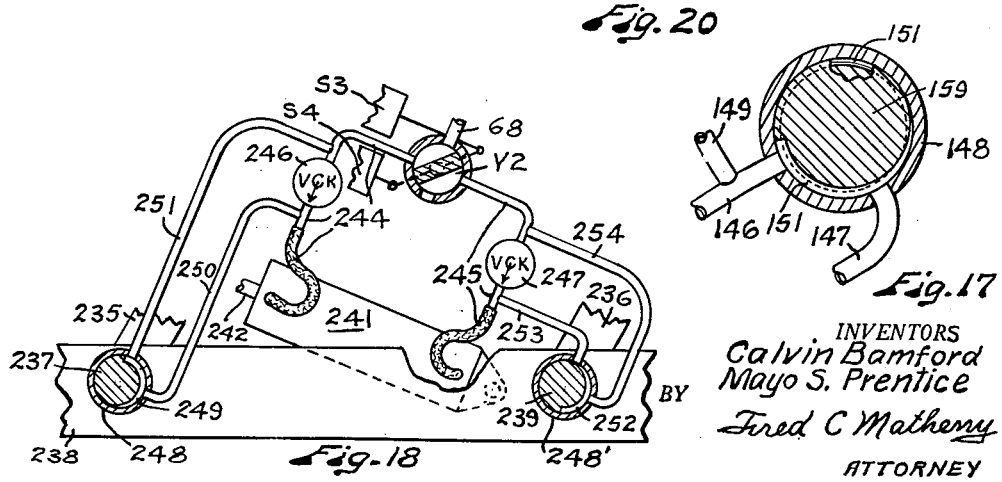

INVENTORS.
Calvin Bamford
Mayo S. Prentice
BY Fred C. Matheny
ATTORNEY.

United States Patent Office 2,998,039
Patented Aug. 29, 1961

2,998,039
MACHINE FOR JOINTING AND GLUING
BUNDLES OF VENEER STRIPS
Calvin Bamford and Mayo S. Prentice, Tacoma, Wash., assignors to Globe Machine Manufacturing Co. Inc., Tacoma, Wash., a corporation of Washington
Filed Apr. 16, 1959, Ser. No. 806,795
17 Claims. (Cl. 144—117)

This invention relates to a machine for jointing and gluing bundles of veneer strips and a general object of this invention is to improve machines of this type and render the same more accurate and efficient and faster in their operation.

In plywood plants a continuous strip of veneer peeled from a log usually passes through a veneer clipper by which it is cut into strips of variable width ranging from a few inches up to about twenty-four inches wide. In making the plywood it is common practice to first edge glue these strips of veneer to form a continuous sheet, then cut the edge glued product into desired widths, usually the full width of the plywood. As the strips of veneer come from the clipper their edges are rough and uneven and it is necessary to joint these edges and make them true and straight before they are edge glued. This machine is designed to receive bundles of veneer strips of variable widths as they have been left by the clipper, shake or vibrate these strips to even up the edges of the strips in the bundles, tightly clamp the bundles of strips which have had their edges evened up and joint either one or both edges of the bundles of strips. Also it applies glue to the jointed edges in the event the strips are to be edge glued.

Other objects are to provide, in a machine of this type, improved and more efficient bundle clamping means and improved and highly efficient devices for indexing or rotatively moving the bundle clamping means and improved and highly efficient devices for shaking or vibrating strips of veneer loosely held in vertical planes by the bundle clamping means for the purpose of evening up the rough edges of the veneer strips in the bundle preparatory to jointing said edges and applying glue to the same.

Another object is to provide a machine if this type having two rotatively movable clamp jaws capable of receiving and loosely holding stacks of veneer strips and having belts extending crosswise of said clamp jaws beneath the same, said belts being mounted and supported and positioned so that they can be tensioned against the clamp jaws whereby they will move with the clamp jaws and support the edges of loosely held veneer strips during rotative movement of the clamp jaws and in so doing prevent bending over and breaking of the edges of the veneer strips loosely held between said clamp jaws.

Another object is to provide a machine of this nature by which a cycle or sequence of operations can be automatically carried out to joint and if desired to apply glue to both edges of the strips in bundles of veneer or to joint and if desired apply glue to either edge of the strips in bundles of veneer or to alternately joint and if desired apply glue to opposite edges of the strips in successive bundles of veneer, it being understood that, in some instances it may be desirable to joint the edges of the veneer strips without applying glue to the same.

Other objects will be apparent from the following description taken in connection with the accompanying drawings.

In the drawings FIGURE 1 is a top plan view of one end portion of a veneer jointer constructed in accordance with this invention, parts being broken away.

FIG. 2 is a side elevation looking in the direction of broken line 2—2 of FIG. 1, parts being omitted.

FIG. 2E is a side elevation looking in the direction of broken line 2E—2E of FIG. 1E, parts being omitted.

FIG. 3 is an end view of the same on a slightly larger scale than FIGS. 1 and 2 and looking in the direction indicated by broken line 3—3 of FIG. 2.

FIG. 4 is a fragmentary side elevation looking in the direction indicated by broken line 4—4 of FIG. 3.

FIG. 5 is a sectional view, with parts in elevation, taken substantially on broken line 5—5 of FIG. 2E and on a larger scale than FIG. 2E.

FIG. 5A is a somewhat diagrammatic view, partly in section and partly in elevation, showing a gravity operated valve.

FIG. 6 is a fragmentary sectional detail, on a larger scale than FIG. 5, showing parts of the belt and belt support of FIG. 5.

FIG. 7 is a sectional view, with parts in elevation, taken substantially on broken line 7—7 of FIG. 2E, and on a larger scale than FIG. 2E, showing a driving means for the inner belts.

FIG. 8 is a detached sectional view showing an indexing lever and indexing pin means carried by said lever.

FIG. 9 is a longitudinal sectional view showing a hydro-pneumatic device used in operating the jaw indexing means.

FIG. 10 is a fragmentary view partly in section and partly in elevation, taken substantially on broken line 10—10 of FIG. 2 showing fragments of two clamping jaws between which is a bundle of loosely held veneer strips with the lower edges of the strips resting on vibratory supports by which their lower edges are evened.

FIG. 11 is a view partly in section and partly in elevation, taken substantially on broken line 11—11 of FIG. 2E and showing a non-driven belt used for supporting the edges of veneer strips while the clamp jaws are being rotatively indexed from a loading to a first vibrating position with the strips loosely held in the jaws.

FIG. 12 is a somewhat diagrammatic fragmentary sectional view illustrative of means which can be used to control the supply of air under pressure to pneumatic clamping cylinders carried by rotatively mounted clamp jaws and by which the clamp jaws are relatively moved toward and away from each other to clamp or unclamp a bundle.

FIG. 13 is a detached elevational view showing discharge belts used in connection with this machine.

FIG. 14 is a schematic view illustrating five different steps and different positions of the veneer clamping jaws in a fully automatic cycle for jointing and applying glue to both edges of the veneer strips forming a bundle held by said jaws.

FIG. 15 is a similar view illustrating five corresponding steps and different positions of the jaws in a cycle for jointing and applying glue to one edge only of the veneer strips carried by the jaws.

FIG. 16 is a similar view illustrating the steps necessary in applying glue to and jointing the other edges of the veneer strips, it being understood that the cycles illustrated in FIGS. 15 and 16 are carried out alternately under certain conditions.

FIG. 17 is a fragmentary sectional view showing means used in regulating the flow of liquid to the hydraulic cylinder of the hydro-pneumatic indexing device shown in FIG. 9.

FIG. 18 is a diagrammatic view, with parts in section, showing shock absorber and speed control means used in connection with the discharge belts shown in FIG. 13.

FIG. 19 is a schematic view illustrating electrically controlled pneumatic operating devices used in this machine.

FIG. 20 is a plan view of an electrical control panel used in connection with this machine.

FIG. 21 is a plan view showing a portable control station or panel used in connection with this machine.

Like reference numerals refer to like parts throughout the several views.

Figure 1:
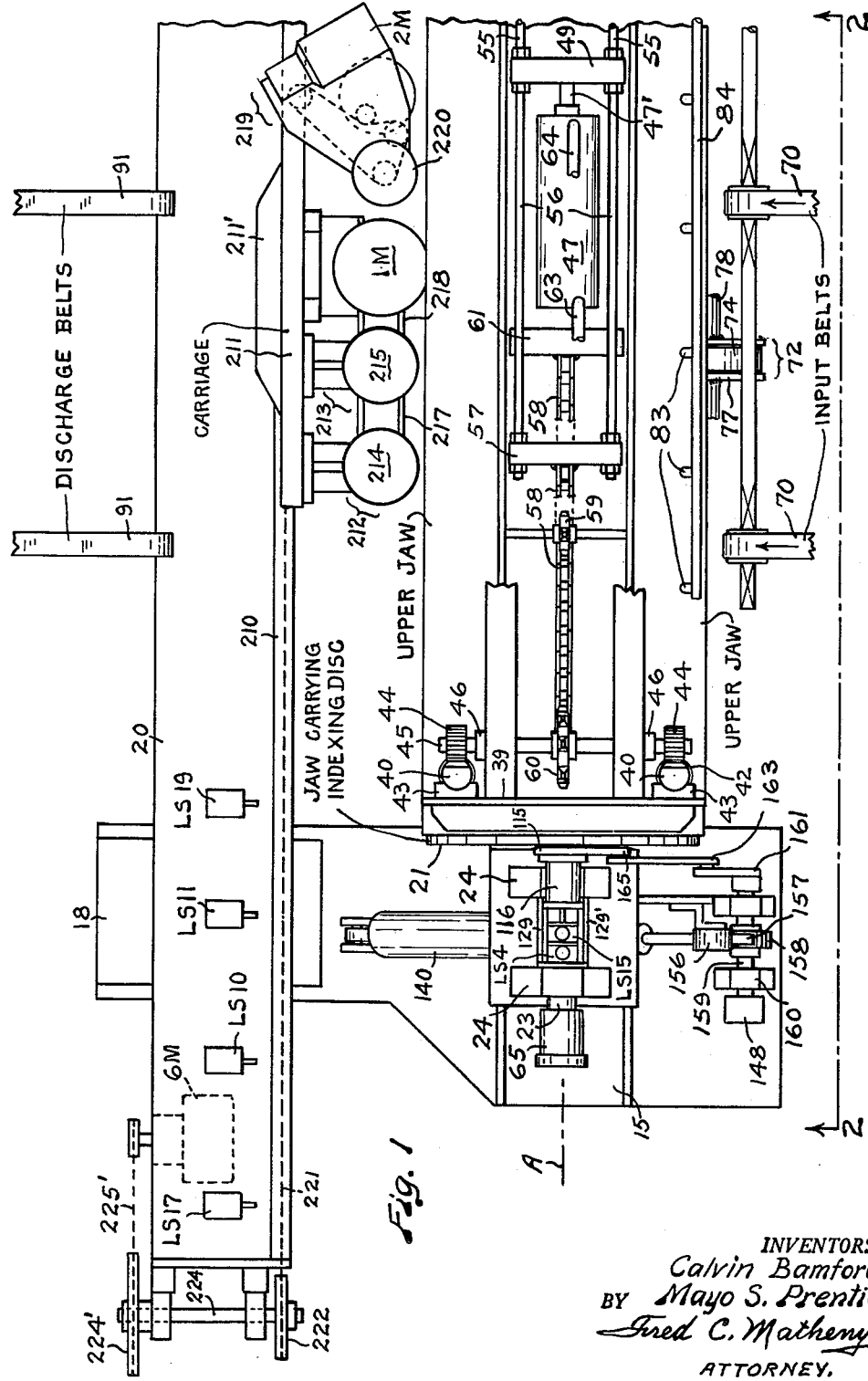
FIG. 1E is a top plan view of the other end portion of said veneer jointer, parts being broken away.

This veneer jointer comprises two spaced apart end pedestals 15 and 16 of built up metal construction capable of supporting the veneer carrying parts of the machine and adapted to be fixedly anchored to a floor 17. The pedestals 15 and 16 are respectively provided with carriage bed supports 18 and 19, FIGS. 1, 1E and 3, which extend sidewise therefrom and support a longitudinally extending carriage bed 20. The carriage bed 20 extends beyond the supports 18 and 19 at the respective ends of the machine, as shown in FIGS. 1 and 1E. This bed 20 is not shown in FIGS. 2 and 2E.

Two opposed jaw carrying discs 21 and 22 are supported for rotation on a common horizontal axis A by the two pedestals 15 and 16. The disc 21 has an axially positioned rigidly attached tubular shaft 23, see also FIG. 12, extending outwardly perpendicularly therefrom. The shaft 23 is journaled in two spaced apart bearings 24 on the pedestal 15. Similarly the disc 22 has an axially positioned rigidly attached shaft 25 extending outwardly perpendicularly therefrom and journaled in two spaced apart bearings 26 on the pedestal 16.

The two jaw carrying discs 21 and 22 are rigidly connected with each other by a relatively long lower jaw or platen which has its two ends rigidly attached to the respective discs 21 and 22 and is indicated generally by numeral 27. A relatively long flat upper jaw or platen, indicated generally by numeral 28, is positioned in opposed spaced relation to the lower jaw 27 and supported for parallel movement toward and away from said lower jaw. The two jaws or platens 27 and 28 are herein shown as being of built up welded construction, but they may be cast.

The lower jaw 27, see FIG. 5, comprises two spaced apart angle bars 30, a flat plate 31 between said angle bars, two diagonal gusset plates 32 reinforcing the angle bars 30, side plates 33 at the lateral edges of said angle bars and bottom plates 34 at the bottom edges of said angle bars. Preferably an end plate 29 is welded to each end of the parts which make up the lower clamp jaw 27 and these end plates are bolted or otherwise rigidly secured to the jaw carrying discs 21 and 22.

The upper clamp jaw is herein shown as made up of two spaced apart angle bars 35, a flat plate 36 between the bars 35, two diagonal gusset plates 37 reinforcing said angle bars 35, top plates 38 welded to the top edges of said bars 35, and end plates 39 welded to the ends of parts 35, 36 and 38. This construction provides the required strength and rigidity needed by the jaws but obviously said jaws 27 and 28 can each be cast in one piece or can each be built up in a different manner. FIGS. 5 and 7 show that, in cross section, the gripping faces of both jaws 27 and 28 are medially relieved or recessed so that maximum gripping pressure on the veneer is applied near the edge from which the bundle of strips protrudes. It has been found that better results are obtained when the veneer strips are thus gripped more firmly near the edge of the jaws from which they protrude.

The supporting means for the movable upper jaw 28 comprises four rack posts 40 rigid with the respective corner portions of the lower jaw 27 and perpendicular to its veneer engaging face. Each post 40 has teeth 41 on one side thereof. Each post 40 extends through an opening 42, shown dotted in FIG. 4, in a flange of one of the angle bars 33 of the upper jaw and is slidably supported by a bushing 43 which is rigid with the upper jaw 28. The teeth 41 on each post 40 mesh with a pinion 44 that is rigid on a cross shaft 45. Each cross shaft 45 is journaled in bearings 46 which are rigid with the upper jaw.

Devices are carried by the upper jaw for rotating cross shafts 45 to move upper jaw 28 relative to lower jaw 27. These devices comprise two double acting pneumatic cylinders 47 and 48 secured in the upper jaw 28 and having piston rods 47' and 48' respectively connected with a first cross yoke 49 and a second cross yoke 50. The second cross yoke 50 is connected with one end of a sprocket chain 51. The chain 51 passes under a guide sprocket 52 and over and around a sprocket wheel 53 which is fixedly secured on the pinion carrying cross shaft 45 shown at the right in FIGS. 1 and 1E and has its other end attached to a third cross yoke 54. The second cross yoke 50 is also connected by rods 55 with the first cross yoke 49 of cylinder 47. Other rods 56 connect said first cross yoke 49 with a fourth cross yoke 57. The fourth cross yoke 57 is also connected with one end of a sprocket chain 58 which passes under a guide sprocket 59 and over and around a sprocket wheel 60 which is non-rotatively mounted on the pinion carrying cross shaft 45 shown at the left in FIGS. 1E and 2E. The other end of the sprocket chain 58 is connected with a fifth cross yoke 61. The fifth cross yoke 61 is connected by rods 62 with the third cross yoke 54. The reason for using two cylinders 47 and 48 is to provide sufficient power for clamping purposes and still keep said cylinders within the dimension limits of the upper jaw 28. These two cylinders operate jointly and as a pair in imparting clamping and unclamping movement to the upper jaw 28.

Because the upper jaw 28, which carries the double acting pneumatic cylinders 47 and 48, is part of a bundle clamping assembly which is intermittently moved rotatively always in the same direction about the axis A these cylinders are connected with air conduits which extend through the tubular bearing or indexing shaft 23. Various devices for accomplishing this can be employed, including the use of union type rotatable joints and valves readily obtainable on the market. One way of providing a controlled supply of air under pressure for these cylinders 47 and 48 is schematically shown in FIG. 12, by way of illustration. FIGS. 1, 1E, 2 and 2E show an air conduit 63 connected with the left end and another air conduit 64 connected with the right end of each cylinder 47 and 48. These conduits are shown in FIG. 12 to be connected by hoses 63a and 64a with conduits 63b and 64b in the tubular shaft 23. The conduits 63b and 64b communicate, by way of annular grooves 63c and 64c in a fixed fitting or sleeve 65 in which the shaft 23 rotates, with conduits 63d and 64d which are connected with the fitting 65 and with a four way valve V7. The valve V7 is connected with suitable electrically actuated means, such as two solenoids S12 and S13, by which it may be actuated to connect either conduit 63d or 64d with an air pressure supply conduit 68 and the other conduit with the exhaust port 67. Thus air under pressure can be supplied to the right ends of both cylinders 47 and 48, FIGS. 1, 1E, 2 and 2E, and the left ends of said cylinders opened to exhaust, or vice versa.

The bundles of veneer V which are to be jointed are brought in on input belts 70, FIGS. 1 and 1E, which deliver the veneer between the two jaws 27 and 28 and onto inner belts 71, see also FIG. 5, which are carried by the lower jaw 27. The jaw 28 does not close on and clamp the bundle of veneer until after the first ninety degree indexing movement of said jaws has taken place and the loosely held strips of veneer have been subjected to shaking or vibration to even up their lower edges. The veneer is loosely held between the jaws during this first ninety degree indexing movement and it is necessary to support the trailing edges of the veneer strips while this movement is taking place. It has been found that the edges of some of these strips are liable to be bent over and broken if said edges are allowed to slide on fixed and non-movable guide means. This objection is overcome by providing at least two spaced apart endless belt type veneer supporting assemblies 72 and 73, FIGS. 1, 1E, 2, 2E and 11, of duplicate construction to support the edges of the veneer strips during this first ninety degree indexing movement.

Each edge supporting belt assembly, see FIG. 11 showing assembly 73, comprises a pliable endless belt 74 supported on two belt pulleys 75 and 76. The belt 74 is freely movable and is herein shown as being a floating type belt which is moved by its contact with the jaw members 27 and 28 and the edges of the veneer strips. Also this belt 74 can be power driven so that it moves in the same direction and at the same speed as the edges of the veneer strips which rest on it. Each set of rollers 75 and 76 is supported from a fixed L-shaped bracket arm 77 which is secured to a rigid frame bar 78. The supporting means for each roller 76 comprises an upwardly extending swinging arm 79 connected by a pivot 80 with an end portion of the bracket arm 77. Pneumatic cylinder type belt pulley adjusting means 81 is interposed between the fixed bracket 77 and swinging arm 79 for moving the belt pulley 76 to the right, FIG. 11, to tighten the belt 74 and in so doing to position the upper lap of said belt so it will contact parts of the clamping jaws to be moved therewith, and at times, will receive and support the lower edges of the loosely held veneer strips. Two air conduits 82 and 82' are connected with the cylinder of the pneumatic unit 81 and form part of a means by which air can be supplied to tighten or slacken belt 74. This air is controlled in a manner hereinafter described so that the belts 74 are always taut except when shaker mechanism hereinafter described is in an "up" or veneer supporting position. Thus the belts 74 are always taut at times when the jaws are being angularly moved or indexed.

A plurality of air jet pipes 83, FIGS. 1, 1E, 5 and 5A, are provided in connection with the upper clamp jaw 28 and are positioned to deliver blasts of air at spaced apart intervals between the two clamp jaws to insure separation and prevent adhesion of the veneer strips when the two jaws are moved to unclamped position after the first clamping and jointing operation in the cycle. Particularly these air jets will loosen the strips of veneer in contact with the upper jaw if it tends to adhere after unclamping. The jet pipes 83 are connected with manifold pipe 84 and said pipe 84 is connected by conduit means 85 with the air supply conduit 63 of the jaw clamping and unclamping cylinders 47 and 48. Thus air pressure can only be supplied to jet pipes 83 when the jaws 27 and 28 are unclamped due to the presence of air pressure in conduit 63.

The discharge of air from jet pipes 83 is further controlled by a weight or gravity operated valve 89, which is interposed in the conduit 85. Gravity operated valves suitable for this purpose are obtainable on the market. A valve of the type diagrammatically shown in FIG. 5A can be used. It comprises a rotatable valve member 89a in a housing 89b. Member 89a is connected with a lever arm 89c which operates between two spaced apart stop members 90 and 90' that are rigid with housing 89b. Arm 89c carries a weight 89d. When the jaws are in the loading position the arm 89c will hang vertically and hold valve 89a closed. During the first two ninety degree indexing movements of the jaws, counterclockwise FIG. 5A, the valve 89 will remain closed and the arm 89c, resting against the stop member 90, will be moved into a generally upright position, as shown by dash lines in FIG. 5A, but will not pass center. When the jaws start their third ninety degree indexing movement in the cycle the weight 90 will pass center, the arm 89c will move angularly until it engages stop 90' and will open valve 89. This occurs at a time when air pressure is present in pipe 63 for opening jaws 27 and 28 and supplies air pressure to jet pipes 63 before the last shaking operation in the cycle occurs. The valve member 89a will be closed by weight 90 as the jaws move back to the starting position. Also air will be cut off from pipe 63.

The lower jaw 27 is provided with a plurality of transversely disposed longitudinally spaced apart inner belts 71 which cooperate with the input belts 70 and with the discharge belts 91 in bringing the bundles to the clamp jaws and discharging the same. Four of the inner belts 71 are shown in FIGS. 2 and 2E and one of said inner belts and the mounting means therefor is shown in FIGS. 5 and 6. Each inner belt 71 is mounted on two sheaves 92 and 93. Sheaves 92 are mounted on a driven shaft 92' extending along one side of jaw 27. The sheaves 93 are mounted on a non-driven shaft 93' which extends along the other side of the jaw 27. The lower lap of each inner belt 71 passes under guide sheaves 94 and over a tightener sheave 95. The several angle bars and plates which form the lower jaw 27 are suitably cut away to provide clearance for the inner belts 71 and the sheaves on which they operate. A belt skid 96 supported by bolts 97' and springs 97 is provided for the top lap of each inner belt to ride on. Nuts 99 limit outward movement of the belt skids 96. The top surface of the members 30 and 31 of the lower jaw 27 is transversely recessed to provide a groove 98 into which each belt skid 96 and the lap of the belt 71 thereon will be depressed when a bundle of veneer strips is clamped between the jaws 27 and 28. This allows surface contact of the lower jaw 27 with a bundle in firmly clamping the same. The springs 97 are strong enough so that when the two jaws 27 and 28 are horizontal and the upper jaw 28 is in a non-clamping position the inner belts 71 will be pressed against a bundle with sufficient force to move the bundle if said inner belts are driven.

Driving means for the inner belts 71 is shown in FIG. 7 and is also shown by dotted lines in FIG. 2E. This driving means comprises an electric motor 4M, also shown in the wiring diagram, FIG. 22. The motor 4M is connected by V-belt means 101 and speed reduction device 102 and belt pulley means 103 with the shaft 92' of belts 71.

Indexing mechanism is provided for imparting intermittent ninety degree indexing movements to the bundle clamping devices. This indexing mechanism, FIGS. 1, 2, 3, 4 and 8, comprises an indexing lever formed of a tubular hub 113, an offset angular arm part 114 and a plate 115, all rigid with each other. The hub 113 is positioned between two bearing members 24 and is fulcrumed on a tubular main shaft 23. The plate 115 is positioned in close proximity to the outer side of the jaw carrying disc 21 and carries an indexing cylinder 116 within which is contained indexing or reset mechanism of a form shown in FIG. 8. This indexing or reset mechanism is capable of engaging with and indexing the bundle clamping assembly when intermittent oscillating cycles of movement are imparted to the lever 113, 114, 115.

The indexing cylinder 116, FIG. 8, has two end plates 117 and 118 which support a stepped indexing pin 119. The pin 119 has an indexing portion 120 which extends through and beyond the inner end plate 118 and toward the jaw carrying disc 21 and which can lock into said jaw carrying disc 21. Said indexing pin 119 further has an outwardly protruding switch operating portion 121 which extends through the outer end plate 117 for switch operating purposes. A piston 122 within the cylinder 116 is secured on said indexing pin 119 between a nut 123 and a shoulder 124. The end plate 118 is rigidly secured to the plate 115 of the indexing lever. The end portion of the part 120 of the indexing pin is adapted to engage within suitable holes 125 in the adjacent jaw carrying disc 21. Four of said holes 125, 125 are provided in said disc 21 at intervals of ninety degrees. Preferably seal or packing members 126 of O ring type are provided around the indexing pin 119 at the location where said pin passes through the end plates 117 and 118. Also a similar seal ring 127 is provided in the periphery of the piston 122. Air conduits 128 and 128' are communicatively connected with the respective end portions of the cylinder 116. Two limit switches LS4 and LS15 are supported from brackets 129 and 129', FIGS. 1, 2, 4 and 8, which are rigid with the end plate 117. These limit switches LS4 and LS15 are positioned so they will be engaged and operated by a knob shaped cam 131 on the indexing pin part 121 at the respective limits of movement of the indexing pin. These limit switches are part of electrical control means hereinafter described.

The indexing lever 113, 114, 115 is preferably oscillated by means which will provide a quick return movement of said lever and which will bring about a controlled and gradual deceleration near the end of the indexing stroke of said lever to provide fast but smooth operation free from vibration. Devices which will accomplish this are best shown in FIGS. 3, 4, 9 and 17. They comprise a combined pneumatic and hydraulic unit, FIG. 9, including a pneumatic cylinder 140 and a hydraulic cylinder 141. Cylinders 140 and 141 have a common piston rod 142. Two pistons 143 and 144 are secured on said rod 142 and operate within the respective cylinders 140 and 141. Air conduits 145 and 145' are connected with opposite end portions of the pneumatic cylinder 140. The hydraulic cylinder 141 is filled with oil or similar liquid and its opposite ends are connected by conduits 146 and 147 with a cylindrical sleeve 148 through which an oscillatory indexing shaft 159 extends.

The end portion of the piston rod 142 which protrudes from the cylinder 141 is connected with a gear rack bar 157 which meshes with a gear wheel 158 that is rigidly secured to the indexing shaft 159. A hold down roller 156 holds the rack 157 in mesh with the gear wheel 158. The indexing shaft 159 is journaled in bearings 160 and carries an indexing crank 161. The outer end of the crank 161 is connected by pivot means 162 with the lower end of indexing link 163. The crank 161 has a travel of preferably slightly less than one hundred eighty degrees. When said crank 161 is in the position shown in FIG. 3 a limit switch LS14 will be actuated. When said crank 161 is at the other or lower extremity of its travel another limit switch LS2 will be actuated.

The upper end of link 163 is connected by a pivot 164 with an extension 165 of part 115 of the indexing lever. Each stroke of the piston rod 142 in one direction will angularly move the indexing lever 113, 114, 115 through an angle of substantially ninety degrees. While this indexing lever 113, 114, 115 is being moved ninety degrees in a clockwise direction from the position in which it is shown in FIG. 3 the indexing pin 119 will be engaged in one of the holes 125 and the bundle clamping mechanism will be advanced or indexed ninety degrees to a new position and locked in this new position, as hereinafter described. The indexing pin is then withdrawn and the indexing lever re-set by moving it counterclockwise back to the position shown in FIG. 3.

Turning back to the quick return and speed control means provided by cylinders 140 and 141, the conduit 146 is connected by a branch conduit 149 with an oil reservoir 150. The sleeve 148 is supported so it can not rotate and the indexing shaft 159 is provided, within said sleeve, FIG. 17, with a tapered peripheral groove 151 which extends about half way around said shaft and is of substantial depth at one end and tapers to substantially no depth at the other end. A packing ring of O ring type is provided on each side of the groove 151. One of these rings 152 is shown fragmentarily in FIG. 17. The points of connection of the conduits 146 and 147 relative to the groove 151 are such as to bring about the following mode of operation: When the indexing shaft 159 is being moved clockwise, FIGS. 3, 4, and 17, this being the direction in which it will be moved on the indexing stroke, the shallow end of the groove 151 will be moving toward the point of connection of conduit 147 with sleeve 148 and relief of oil from the right end of the cylinder 141 will be progressively decreased or pinched off with the result that the first part of the indexing movement can be fast and the speed will decrease gradually and the indexing movement will be stopped without shock, vibration or rebound. Upon counterclockwise re-set or return movement of the shaft 159 and the indexing lever parts connected therewith oil in the left end of the cylinder 141 has a free escape to the reservoir 150 by way of conduits 146 and 149 and vacuum in the right end of cylinder 141 will be relieved by oil flowing thereinto by way of conduit 146 and the then expanding groove 151 and the conduit 147.

To lock the bundle clamping mechanism firmly in the several positions in which it is stopped we provide, at a location substantially diametrically opposite to the position in which the indexing cylinder 116 is shown in FIG. 3, a fixed and non-movable pneumatic locating or locking cylinder 170 similar to the indexing cylinder 116 and having similar mechanism within it, including a locking pin 171 similar to the indexing pin 119 shown in FIG. 8. The locking cylinder 170 is secured to a frame plate 172 and said locking cylinder carries a limit switch LS1 positioned and arranged similarly to the indexing switch LS4 of the indexing mechanism and adapted to be actuated by retractile movement of the locking pin 171. Two air conduits 173 and 174, see also FIG. 19, are connected with the locking cylinder 170.

Loose bundles or stacks V of horizontally disposed veneer strips are supplied to the machine by the input belts 70. These belts 70 can be operated to deliver the bundles, one at a time, between the jaws 27 and 28 and onto the inner belts 71. The inner belts 71 are moving at the time the bundle is delivered. The operator controls the infeed of each bundle and stops the input belts 70 and the inner belts 71 when the trailing edge of the bundle is a short distance inside of the clamping jaws. He then starts the cycle of operation of the machine, as hereinafter explained, and without closing the clamping jaws, the jaw assembly with the loosely held bundle therein is indexed or angularly moved from the starting position to a position shown in FIG. 10, this being a ninety degree movement which positions the bundle so that the loosely held strips therein are vertical for the purpose of shaking.

The previously described guide belts 74, FIGS. 1, 1A, 2, 2A and 11, are provided to facilitate indexing the bundles of loose strips from the loading to the first shaking position. These guide belts 74 can be non-driven and floating and free to be moved by contact with the jaws 27 and 28 and the losely held strips of veneer between said jaws. These guide belts 74 support the edges of the veneer strips and move with said veneer strips and do not tend to drag on the strips or to bend the edges of the strips over.

The slackening of the guide belts 74 after the jaws have been indexed ninety degrees from their loading position leaves the edges of the veneer strips which make up the loosely held bundle resting on two spaced apart vibratory supports 186 and 187, FIGS. 2, 2E and 10, which are rigid with a vibrator beam 188. The beam 188 has two air operated vibrators 189 and 190 secured thereto beneath the respective supports 186 and 187. The vibrators 189 and 190 are connected with a common air supply conduit 180, FIG. 19. These vibrators are of conventional construction and are not herein described in detail.

The vibrator beam 188 is supported for vertical adjustment by two pneumatic lift devices 191 and 192, FIGS. 2, 2E and 10, positioned near the respective ends of said beam. Each pneumatic lift device, FIG. 10, comprises a pneumatic lift cylinder 193 having therein a piston 194 connected by a piston rod 195 with a plate 196. Each plate 196 is spaced beneath another plate 197 by a pad 198 of rubber or like elastic material. The beam 188 rests on and is secured to the plate 197. The plate 196 is movable relative to the plate 197 and is guided by end flanges 199 and brackets 200, both of which are rigid with the upper plate 197. The brackets 200 limit movement apart of the two plates 196 and 197. The plate 196 is connected with a base 201 by rods 202. The rods 202 are free to move downwardly relative to the base 201 and said rods have nuts 203 on their lower ends which limit their upward movement. Air supply conduits 176 and 177 are connected with the cylinders 193.

The beam 188 can be raised by the cylinders 193 to properly position the members 186 and 187 to receive and support and vibrate a bundle of veneer strips and it can be lowered by said cylinders so that the beam 188 and the members 186 and 187 will be out of the way of the jaws 27 and 28 and the bundle which may be held between said jaws. The elastic pad 198 allows the beam 188 to be vibrated by operation of the vibrators 189 and 190 and the vibration of this beam evens the lower edges of all veneer strips supported on the members 186 and 187. The auxiliary belts 74 are slack during the time the beam 188 and members 186 and 187 are raised. After a loosely held bundle of veneer strips has been vibrated the then vertical upper jaw 28 is moved toward the lower jaw 27 to securely clamp the bundle with the evened up edges of the strips protruding from the then lower edges of the jaws. The beam 188 and members 186 and 187 are then lowered and the jaws are indexed through an angle of ninety degrees to properly position the protruding edge of the clamped bundle for jointing.

The jointing and gluing mechanism shown in FIGS. 1 and 3 comprises a carriage bed 20, which extends alongside of and is parallel with the bundle clamping means. The bed 20 has a gib type track 210 and a flat plate shaped carriage member 211 is movably supported by this track and is disposed in a vertical plane. Two jointer head spindle assemblies 212 and 213 are mounted on and carried by the carriage 211 and support two jointer heads 214 and 215 respectively. The jointer mechanism does its cutting while moving from right to left, FIGS. 1 and 1E. The jointer head 214 makes a roughing cut and the jointer head 215 a finishing cut. A motor 1M mounted on the carriage 211 is connected by V-belt and pulley means 217 and 218, FIGS. 1 and 3, with the shafts of the respective heads 214 and 215 for driving said heads. Glue applicator means, indicated generally by 219, and including a motor 2M and a wet glue applicator roll 220 is also carried by the carriage 211. The jointer units and glue applicator are all of well known conventional construction and are not herein described in detail.

The carriage 211 is moved longitudinally of the machine by a link belt 221, diagrammatically shown by dotted lines in FIGS. 1 and 1E, which is secured to said carriage and passes around sprocket wheels 222 and 223 at the respective ends of the carriage bed 20. The sprocket wheels 222 and 223 are mounted on shafts 224 and 225 respectively. One of said shafts, preferably the shaft 224, has another sprocket wheel 224' secured thereto and connected by a sprocket chain 225' with a reversable motor 6M, whereby the carriage 211 can be longitudinally moved back and forth along the machine.

The starting position for the carriage 211 is at the end of the machine shown at the left in FIGS. 1 and 2. While a bundle is being subjected to its first vibration and is being clamped the carriage is retractively moved from the left to the right end of the machine. After the vibrated and clamped bundle has been properly positioned for jointing the jointing and gluing is done while the carriage is being moved from the right to the left end of the machine. The clamping means is then indexed while the carriage is at the left end of the machine, preparatory to the vibrating, clamping and jointing of the other edges of the strips in the bundle. The jointing and gluing of the last edge of the bundle leaves the bundle clamping means in its starting or loading position ready for the next starting of the input belts 70 and inner belts 71, which will eject the jointed and glued bundle onto the discharge belts 91 and feed a new bundle into the jaws.

Fragments of the discharge belts 91 are shown in plan in FIGS. 1 and 1E and a side view of one of these belts and the mounting means thereof is shown in FIG. 13. A plurality of these discharge belts are provided in spaced apart relation and said belts are all mounted in such a manner that they are movable as a unit. Also these belts are all driven from the same shaft 231, which has a driving connection by a sprocket chain 231' or like means, with a speed reduction type motor 3M. Each discharge belt 91 is mounted on a belt skid 232 which has two sheaves 233 and 234 at its respective ends to carry and drive the belt. The sheaves 233 at the outer end of the belt skids 232 are all secured to the motor driven shaft 231. The sheaves 234 at the inner end of each skid can be mounted on bearing members 230.

The several belt skids 232 are all connected together by the shaft 231 and by their mounting means. This mounting means comprises at least two sets of parallel skid supporting bars, one set of which is shown in FIG. 13. Each set of said bars comprises two bars 235 and 236. The lower ends of the bars 235 are rigidly attached to a shaft 237 and the lower ends of the bars 236 are rigidly attached to a shaft 239. The shafts 237 and 239 are journaled in base frame means 238. The upper ends of the bars 235 and 236 are connected by pivots 240 with the belt skids 232. An air cylinder 241 has its piston rod 242 connected by a pivot 243 with one of the bars, such as bar 235, so it can swingingly move the bars 235 and 236 and parts carried thereby between a bundle receiving position, shown by full lines in FIG. 13, and a bundle discharge position shown by dot and dash lines. Obviously two or more air cylinders like the cylinder 241 of FIG. 13 can be used in connection with each set of belts 91. Two fluid conduits 244 and 245 are connected with the respective end portions of the cylinder 241.

The discharge belt structure just described can be used in connection with driven or live rolls 250 for selective discharge of bundles. Rolls 250 are positioned between the spaced apart discharge belts and about mid way of the length of said belts when said belts are in their bundle receiving position and preferably with the level of the tops of the rolls slightly below the level of the tops of the belts when the belts are in said bundle receiving position. If the belts 91 are stopped with a bundle of veneer V resting near their receiving ends, as shown by full lines in FIG. 13, and the discharge assembly is then moved to the position shown by dot and dash lines the bundle V will be set down on the live rolls 250 and can be moved endwise by said rolls in discharging it from the discharge assembly. If the belts 91 are stopped when the bundle V is near or over or beyond the live rolls 250 then said bundle will not engage the rolls 250 at all but will pass over them or be lifted over them and can be removed from the outer end portions of said belts 91. Vertically movable rolls, of the form commonly termed "jump rolls" can be used in connection with these discharge belts if desired. An adjustable limit switch LS22 is positioned near the outer end of the belts 91 for operation by the bundles V. Also another limit switch LS20 is positioned for operation by the support bar 236 at or near the innermost limit of movement of the discharge belts. The functions of these limit switches are hereinafter explained.

The discharge belts and their loads are fairly heavy and it is desirable to move them speedily between the two positions shown in FIG. 13 and to stop them smoothly and easily at the ends of their travel. This can be done by providing, in connection with each shaft 237 and 239, air control devices similar to the oil control devices shown in FIG. 17 and used in connection with the indexing mechanism. This control means, see also FIG. 18, operates in connection with the two conduits 244 and 245 and an air control valve V2 with which these conduits are connected. An air supply pipe 68 supplies air under pressure to valve V2. Two check valves 246 and 247 are interposed in the respective conduits 244 and 245. Each check valve permits a free inflow of air from the valve V2 to the cylinder 241 but directs exhaust air from cylinder 241 through a by-pass of variable area by which the rate of exhaust is controlled. The shafts 237 and 239 are rigid with the arms 235 and 236 and are oscillated by swinging movement of these arms. Shaft 237 is rotatively received in a fixed cylindrical shell 248 and the part of the shaft within said shell has a tapered annular groove 249 similar to the previously described groove 151 of FIG. 17.

The by-pass conduits 250 and 251 have ends connected at spaced apart locations with the shell 248 so that they communicate with the groove 249 and have their other ends connected with the conduit 244 at opposite sides of the check valve 246. The tapered groove 249 is shaped and positioned so that as the shaft 237 rotatively moves counterclockwise, FIGS. 13 and 18, during the outward movement of the assembly of discharge belts, and particularly near the end of this outward movement, it will progressively restrict the area of the by-pass formed by conduit 250, groove 249 and conduit 251, through which exhausting air must pass and in this way will arrest the outward movement smoothly and without shock.

Similarly the shaft 239 has a tapered groove 252 and its shell 248' is connected by conduits 253 and 254 with the conduit 245, forming a by-pass around the check valve 247. The area of this by-pass will be progressively restricted as the shaft 239 is moved clockwise in moving the discharge belts inwardly.

The grooves 249 and 252 are dimensioned, arranged and positioned so that the discharge belt assembly can be moved freely and rapidly during the first part of its travel in each direction and will then be brought to a smooth and easy stop without shock or rebound. Thus movement of the discharge belt assembly in one direction is cushioned by the shaft 237 and movement in the other direction is cushioned by the shaft 239, making possible rapid movement of this assembly without shock or jar.

The cycles illustrated in FIGS. 14, 15 and 16 are briefly described in the succeeding paragraphs and the operating and control means by which these cycles are attained are hereinafter more fully described in connection with FIGS. 19 and 22.

In much of the edge gluing work it is desirable to joint and glue both edges of each strip, particularly where narrow strips are being handled. In other cases, for instance when wide strips are being handled in pairs after they have passed through this machine, it may be desirable in the interest of saving time and labor to joint and glue alternate edges or faces of successive bundles. Or in instances where taping of wide strips is being done it may be desirable to omit the gluing and to joint alternate edges or faces of successive bundles. The glue applicator roll 220 can be retracted clear of the work and power to the motor 2M cut off when it is not desired to edge glue the veneer.

The fully automatic cycle for jointing and gluing both edges of a bundle is illustrated in FIG. 14 and is as follows. At the starting or "load" position 1A the jaws 27 and 28 are unclamped or spread apart and are locked in a horizontal position so they can receive a bundle of veneer from the input belts 70. After a bundle is delivered between said jaws they are unlocked and rotated ninety degrees and locked in the position shown at 2A. In moving to the 2A position the loosely held sheets of veneer rest on the then taut guide belts 74 and these guide belts move with the jaws and prevent the then lower edges of the veneer sheets from being bent over and damaged. When the jaws 27 and 28 reach the 2A position they are locked against rotation and the shaker mechanism is raised and the guide belts 74 are slackened so that the bundle rests on the shaker bars 186 and 187. The vibrators 189 and 190 are then energized to shake or vibrate the veneer and the carriage is started on its return movements. At about the time thec arriage reaches its maximum return position the vibrators 189 and 190 are deenergized leaving the bundle resting on the bars 186 and 187 in a proper position for clamping. The jaws then clamp the bundle, the shaker mechanism is lowered and the bundle clamping assembly is unlocked and rotatively moved to position 3A where it is again locked and the evened edges of the bundle jointed and glued. Next the jaws are unlocked, unclamped, rotatively moved to position 4A, locked in this position with the other edges of the veneer strips resting on the then raised vibratory supports 186 and 187, and the vibrators are again operated to even up these other edges. The jaws are then clamped, the shaker mechanism is lowered, and the bundle clamping assembly is unlocked and rotatively moved to position 5A where it is again locked and the second edge of the bundle is jointed and glued. The jaws are then unclamped leaving them in the starting position 1A but with a jointed and glued bundle resting on the inner belts 71. As soon as the carriage has made its last jointing run in the cycle the discharge belts 91 are moved inwardly into a position to receive the bundle. Starting of the infeed belts 70 and inner belts 71 at the beginning of the next cycle will eject the jointed and glued bundle and feed another bundle into the machine.

In the cycle for jointing one edge only, illustrated in FIG. 15, the operations and positions 1B, 2B and 3B are the same as for the respective positions 1A, 2A and 3A of FIG. 14, except that at position 3B the jaws do not open after the jointer makes its run but remain closed, are rotatively moved two ninety degree steps or one hundred eighty degrees to position 4B and then unclamped leaving them in position 5B ready for ejection of the bundle, which has had its trailing edge jointed and glued if the glue mechanism has been in operation.

In the cycle illustrated in FIG. 16 the leading edge of the bundle is jointed and glued, provided the glue applicator is in operation. This jointing, and if desired gluing, of right and left edges of successive bundles saves time and labor, particularly in handling wide strips, both in taping and edge gluing. In the said FIG. 16 cycle the loading operation at position 1C is the same as at positions 1A and 1B of FIGS. 14 and 15. The jaws are then rotated to position 2C and clamped without vibrating the veneer. They are then rotated to position 3C and unclamped. Next they are rotated another ninety degrees to position 4C where the veneer is vibrated, the carriage returned, the shaker mechanism lowered and the veneer is clamped. The jaws are then rotated the last or final ninety degrees to position 5C where jointing, and if desired gluing, of the then leading edge of the bundle takes place, the discharge belts are moved into veneer receiving position, the jaws are unclamped and the bundle is ejected usually simultaneously with the loading of the next bundle. In single edge gluing the cycles illustrated in FIGS. 15 and 16 are alternately carried out. It is of advantage and saves time to have alternate edges of the bundles of strips jointed where the strips are manually handled and an operator places the jointed edges of the two strips of each pair together and feeds them endwise through glue curing or veneer taping means.

In the drawings each limit switch is designated by the prefix "LS" followed by a number. These limit switches are numbered LS1, LS2, LS4 to LS23 inclusive, and LS27. Eight of these limit switches are shown in FIGS. 1 and 1E on the carriage bed 20 and positioned for operation by the contactor 211' of the carriage 211. Seven limit switches are shown at the right in FIG. 1E positioned for operation by cams on the end pate 22 of the clamp jaw assembly. The other limit switches are shown in operative positions in FIGS. 2, 2E, 3, 4, 8 and 13 and all of said limit switches are diagrammatically shown in FIG. 22. In instances where a limit switch, referred to by the same number, is shown in more than one place in FIG. 22, each showing indicates contacts of that switch, all embodied in one unitary limit switch device and operated simultaneously. Where, in FIG. 22, lines are shown under the designating characters of limit switches these lines indicate that both contacts of the switch are in use.

Figure 22:
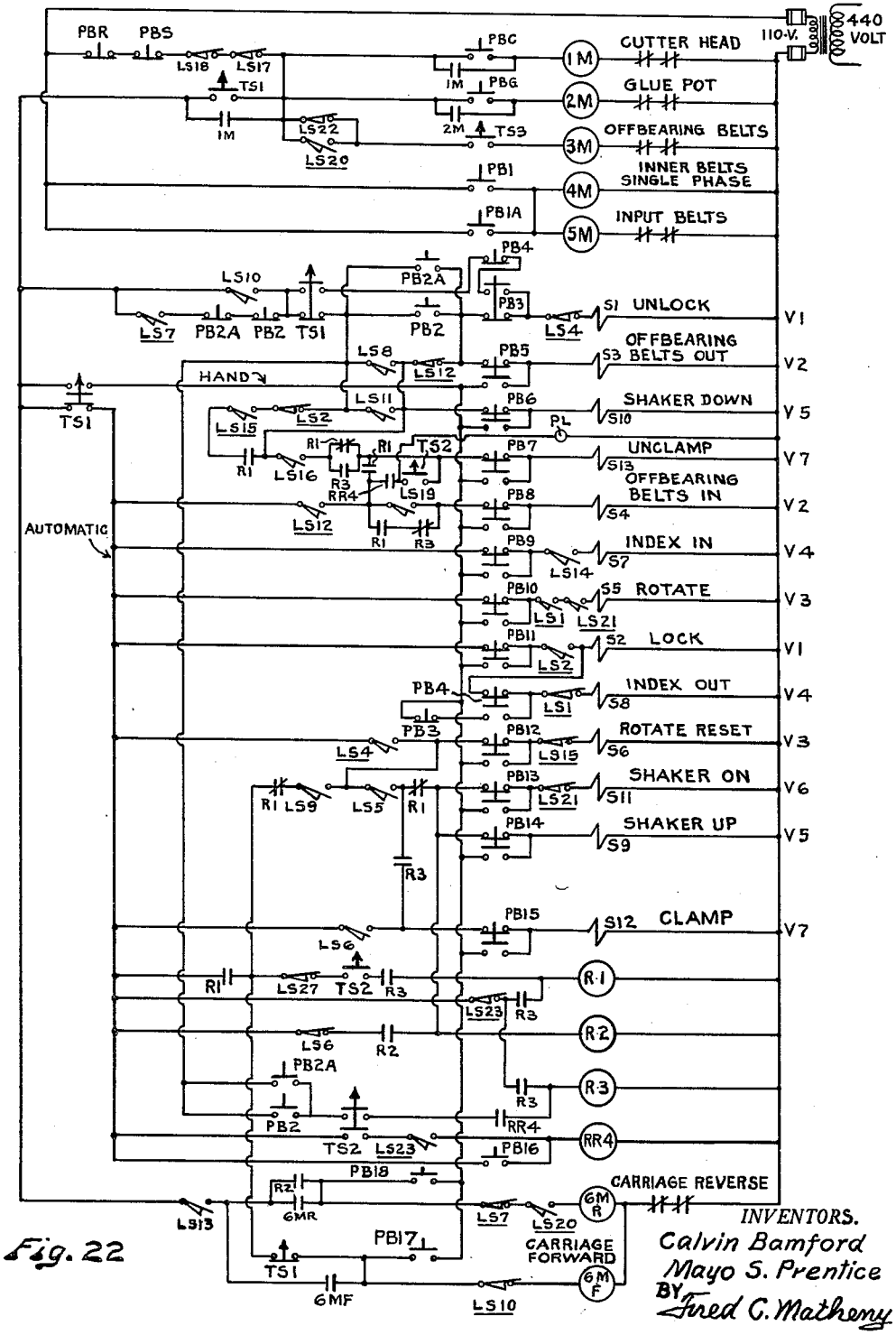
FIG. 22 is a ladder type wiring diagram illustrative of electrical control means used in carrying out the cycles of operation illustrated in FIGS. 14, 15 and 16.

Also in FIGS. 12, 19 and 22 electrical devices for operating valves are designated by prefix "S" followed by a number and are herein referred to as solenoids and valves are designated by the prefix "V" followed by a number. Seven valves V1 to V7 inclusive and thirteen solenoids S1 to S13 inclusive are shown schematically in FIG. 19. Two solenoids are used for operating each valve except V6 which is operated by one solenoid. The same solenoids are diagrammatically shown in FIG. 22 and the designating character of the valve with which each solenoid is connected is shown at the right in line with the solenoid. It will be understood that solenoid operated valves of standard construction are preferably used.

Limit switch LS1 is operated by the withdrawal of the locking pin 171. It has normally open contact in the circuit of the "rotate" solenoid S5 and a normally closed contact in the circuit of the "index out" solenoid S8.

Limit switch LS2 is operated at the end of each indexing movement of the clamp jaw assembly. It has a normally open contact in the circuit of the "lock" solenoid S2 and the circuit of the "index pin out" solenoid S8 and a normally closed contact in the circuit of the "unlock" solenoid S1 capable of preventing energizing of S1 during single edge jointing.

Limit switch LS4 is operated by withdrawal of the index pin 119. It has a normally open contact in the circuit of "rotate reset" solenoid S6 and a normally closed contact in the circuit of "unlock" solenoid S1.

Limit switch LS5 is operated by suitable cams on the end plate 22 of the clamp assembly. It has a normally open contact in the circuit of "shaker on" solenoid S11 and brings about the operation of the shakers 189 and 190 when the clamp assembly is in the correct position for shaking.

Limit switch LS6 is operated by reverse movement of the carriage. It has a normally open contact in the circuit of "clamp" solenoid S12 and a normally closed contact in the circuit of relay R2.

Limit switch LS7 is operated by reverse movement of the carriage. It has a normally closed contact in the "carriage reverse" circuit of motor 6M and a normally open contact used as an interlock in the circuit of "unlock" solenoid S1.

The limit switch LS8 is operated by reverse movement of the carriage. It is operated momentarily and has a normally open contact in the circuits of "unlock solenoid" S1, "shaker down" solenoid S10, and "unclamp" solenoid S13 when LS16 is closed.

Limit switch LS9 is operated by suitable cams on the end plate 22 of the clamp assembly when said assembly is in position for jointing. It has a normally open contact in the "carriage forward" circuit of motor 6M.

Limit switch LS10 is operated near the end of forward movement of the carriage. It has a normally closed contact in the "carriage forward" circuit of motor 6M and a normally open intelock contact in the circuit of "unlock" solenoid S1.

Limit switch LS11 is operated momentarily near the end of forward movement of the carriage. It has a normally open contact in the circuits of "unlock" solenoid S1, "shaker down" solenoid S10, and in the circuit of "unclamp" solenoid S13 when LS16 is closed.

Limit switch LS12 is operated by a cam on the end plate 22 of the clamp assembly when said clamp assembly is in the position it will occupy at the end of the cycle. It has a normally closed contact which is in the circuit of the "unlock" solenoid S1 and a normally open contact which competes the circuit to the "unclamp" solenoid S13 during single edge jointing.

Limit switch LS13 is operated by cams on the end plate 22 of the clamp assembly when said assembly is in the proper position for carriage travel. It has a normally open contact in both the "carriage forward" and the "carriage reverse" circuits of the motor M6, preventing carriage travel unlesss the clamp assembly is properly positioned.

Limit switch LS14 is operated at the end of the return stroke of the indexing mechanism. It has a normally open contact in the circuit of "index in" solenoid S7.

Limit switch LS15 is operated by the insertion of the index pin 119. It has a normally open contact in the circuit of the "unlock" solenoid S1 during single edge jointing and a normally closed contact providing an interlock in the circuit of "rotate reset" solenoid S6.

Limit switch LS16 is operated by cams on the end plate 22 when the clamp assembly is in an unclamping position. It has a normally open contact in the circuit of "unclamp" solenoid S13.

Limit switches LS17 and LS18 are final safety limit switches. They are respectively operated by the carriage in the event of overtravel in either direction. They have normally closed contacts in the circuits of "cutter head" motor 1M and "glue pot" motor 2M.

Limit switch LS19 is operated by the carriage near the end of its forward travel. It has a normally open contact in the circuit of "discharge belts in" solenoid S4.

Limit switch LS20 is operated by movement toward the carriage of the discharge belt assembly. It has a normally open contact in the "carriage reverse" circuit of motor 6M and in the circuit of motor 3M. It prevents carriage reverse travel until the discharge assembly is clear of the path of the carriage and it starts the discharge belts 91 when said belts are in position to receive bundles.

Limit switch LS21 is operated by the lowering of the shaker mechanism. It has a normally open interlock contact in the circuit of "rotate" solenoid S5 which prevents rotation of the clamp assembly until after the shaker mechanism is clear of its path and it has a normally closed contact in the circuit of "shaker on" solenoid S11.

Limit switch LS22 is operated by an outwardly moving bundle on the discharge belts 91. It has a normally closed contact in the circuit of motor 3M and stops belts 91 if LS20 is open.

Limit switch LS23 is operated by a cam on end plate 22 at approximately the end of the first one hundred eighty degrees of indexing movement. It has a normally open contact in the circuit of ratchet relay RR4 and a normally closed contact in the circuits of relays R1 and R3.

Limit switch LS27 is operated by a cam on end plate 22 at the end of each cycle. It has a normally closed contact in the circuit of relay R1 and isolated R1 when single edge jointing is being done.

In providing control means to carry out the cycles of this machine it is desirable to provide a portable control station 261, FIG. 21, movable by an operator into various positions around the machine and by which said operator can start the automatic cycles, can stop the machine and can control the ejection and loading of bundles. This portable control station 261 includes three switches PB1A, PB2A and PBR, which are also shown in the wiring diagram, FIG. 22.

It is further desirable to provide non-portable manually operated switches by which the machine can be started and stopped and loaded and by which each step in the operation of the machine can be individually controlled manually. This is done by providing, at the end of the machine shown at the right in FIGS. 1E and 2E, a control panel 260. This control panel is provided with preferably twenty-four switches, shown in FIG. 20, together with the legends preferably used in connection therewith. Also for purpose of this explanation these switches are marked with the same reference characters, respectively, that are applied to the same switches in the wiring diagram, FIG. 22, these reference characters being PB1 to PB18 inclusive, PBS, PBC, PBG, TS1, TS2 and TS3.

Before starting an automatic cycle of the machine it is necessary that certain parts be operating or be in predetermined positions in which they operate limit switches in the circuit. The switches on the manual control panel can be used to initially bring about the necessary starting conditions, after which the automatic operation can be controlled by the portable control devices 261.

To start an automatic cycle for jointing and gluing both edges of bundles the switches PBC and PBG in the circuits of cutter head motor 1M and glue pot or applicator motor 2M must be closed and the cutter heads and glue applicator operating. Also the jointer carriage 211 must be at the end of the machine shown at the left in FIG. 1, with limit switch LS10 actuated by switch engaging member 211'. Also the discharge belts 91 must be in bundle receiving position with LS20 closed. Also the clamp indexing mechanism must be in the position shown in FIG. 3 with locking pin 171 in locked position releasing LS1. The reset mechanism must be in reset position actuating LS14 and index pin 119 must be inserted releasing LS4 and actuating LS15. Also the clamp jaws must be in open position and the shaker apparatus, including beam 188, must be down, with LS21 actuated.

The "automatic start" switches PB2A on the portable control 261 and PB2 on the panel 260 are in parallel. Also "load jointer" switches PB1A and PB1 are in parallel and "stop" switches PBR and PBS are in series.

To carry out double edge jointing and gluing and with the parts properly positioned, as just hereinbefore described, the cycle illustrated in FIG. 14 is carried out as follows: The operator first loads the machine by closing the switch PB1A in the circuits of motors 4M and 5M and operates both the input belts 70 and the inner belts 71 just long enough to feed a bundle of veneer between the clamp jaws, the bundle being stopped by opening the switch PB1A when the trailing edge of said bundle is just within the clamp jaws. He then starts the cycle by momentarily closing the switch PB2A and completing a circuit through LS4 to solenoid S1, FIGS. 19 and 22, which will operate valve V1, admit air through conduit 174 to the cylinder of lock unit 170 and withdraw locking pin 171. At the same time it will complete a circuit to the solenoid S3 which will operate a valve V2 and admit air through conduit 245 to the cylinder 241 to move the discharge belts out. When lock pin 171 is withdrawn it will actuate limit switch LS1 in the circuit of solenoid S5 which will operate "rotate" valve V3, admitting air by way of conduit 145 to cylinder 140 and rotatively moving the reset or indexing mechanism and the clamp jaws through an angle of ninety degrees in a clockwise direction, FIG. 3. At this point LS2 in the circuit of lock solenoid S2 is actuated and operates valve V1 to supply air by way of conduit 173 to lock cylinder 170 and lock the clamp jaws by inserting locking pin 171. Also the actuation of LS2 will complete the circuit to solenoid S8 causing it to operate valve V4 and admit air through conduit 128' to retract indexing pin 119. The retraction of indexing pin 119 actuates LS4 which brings about the following operations: It actuates solenoid S6 which operates valve V3 to admit air through conduits 145' to the reset cylinder 140 to rotatively move the reset mechanism back to the position in which it is shown in FIG. 3. It actuates solenoid S11 by way of then closed switch LS5, which in turn operates valve V6 to supply air by way of the conduits 66 and 177 to lift shaker apparatus beam 188. This operation of valve V5 also supplies air by way of conduits 66, 177 and 82' to the belt tightener cylinders 81, see also FIG. 11, to slack the guide belts 74. It also energizes electrical control relay R2, closing the normally open contacts of R2 which brings about the closing of the "carriage reverse" circuit of the motor 6M, providing the discharge belts are retracted far enough to have closed the normally open switch LS20. The remaining normally open contacts of relay R2 close and through normally closed LS6 provide an electrical holding circuit for R2 and solenoids S9 and S11.

At this point in the cycle the loosely held bundle of veneer rests on the shaker bars 186 and 187 and the shaker vibrates throughout most of the duration of the carriage reverse movement. Near the end of its reverse travel the carriage operates limit switch LS6 and brings about the following: It actuates clamp solenoid S12, which operates valve V7 admitting air through conduits 68 and 63 to cylinders 47 and 48 to clamp the bundle. At the same time through LS6 it interrupts the electrical holding circuit to R2 and solenoids S9 and S11. Upon interruption of the holding circuit to S11 the valve V6, which can be closed by a spring 181, stops the flow of air to the shaker units 189 and 190. When the carriage reaches the end of its reverse travel LS7 and LS8 are actuated but LS8 will be released just before the carriage stops. Release of LS8 de-energizes S1 of valve V1 of lock unit 170 so that S2 may shift V1 to insert lock pin 171 at the termination of the clamp assembly rotation. All of this takes place while contactor 211' of carriage 211 is resting on LS7. The above holds true also for LS10 and LS11 when the carriage is at the opposite end of the machine.

The actuation of LS7 and LS8 energizes solenoid S1, which operates valve V1 and admits air by way of conduits 69 and 174 to lock cylinder 170 to retract the lock pin 171. It also actuates solenoid S10 which operates valve V5 to admit air by way of conduits 66 and 176 to the cylinders 193 of shaker lift units 191 and 192 and lower the shaker assembly. It also breaks the reverse circuit to the carriage motor 6M and stops the carriage.

With the unlocking operation of valve V1 and retraction of locking pin 171 the cycle begins to repeat, but LS5 is now open and LS9 closed due to the position of the rotatively movable clamp assembly. In the repeat operation the closed clamp jaws with bundle therein are indexed another ninety degrees to bring the evened edges of the bundle of veneer into the position shown in FIG. 3 and are locked in this position and the indexing pin retracted. The actuation of LS4 by retraction of the indexing pin 119, with LS5 open and LS9 closed, brings about the closing of the carriage forward circuit of motor 6M and the carriage makes its forward run, jointing and gluing one edge of the bundle. Near the forward end of the carriage travel the switch actuating member 211' of the carriage actuates LS11 and LS10 but LS11 is released just before the carriage stops. This is the half way point of a complete cycle. In the last half of the cycle the steps just hereinbefore described are repeated, with two exceptions.

These exceptions are, when the clamping assembly has been indexed through a total of three hundred sixty degrees LS12 will be actuated by a cam on the end plate 22 of the clamp assembly, isolating the circuit to electrical control means S1, interrupting the sequence of operations normally instigated when the carriage 211 makes its jointing run and bringing the automatic cycle to an end. Also during the last jointing run as the carriage 211 nears the end of its travel LS19 is operated, completing a circuit through now closed LS12 to electrical control means S4, operating valve V2, admitting air through conduit 244 to cylinder 241 and moving the discharge belt assembly in close to the jointer to receive the bundle.

When a finished bundle is ejected from the jointer and is carried by the belts 91 across the discharge assembly LS22 is operated, interrupting the circuit to the motor 3M and stopping the discharge belts. When the discharge belt assembly is moved inwardly at the beginning of the next cycle, closing LS20, the circuit will be completed to motor 3M by shunting LS22 and the bundle discharging operation which was interrupted by the opening of LS22 will be continued.

To begin the single edge jointing, and if desired gluing, of alternate edges of successive bundles, the switch TS2, marked "joint one edge" in FIG. 20 must be closed or in the "on" position. The condition or setting of ratchet relay RR4 must be correct. This setting is controlled by switch PB16 and a signal light or pilot light PL is preferably provided and connected so that it will be lighted when the contacts of RR4 are in the proper condition for alternate single edge jointing. Also switch TS1 must be in the position shown in FIG. 22 to complete the "automatic" circuit and interrupt the "hand" circuit. Also switch TS3 of offbearing belt motor 3M must be closed or "on." All other conditions must be the same as required to start double edge automatic jointing. The jointer is loaded in the same manner by using switch PB1A to operate input belts 70 and inner belts 71. The automatic cycle is started by the closing of PB2 or PB2A and all functions are identical with double edge jointing up to and including the first jointing operation.

When the "carriage forward" circuit of motor 6M was energized by the closing of LS9 to start the first jointing operation relay R1 was operated, holding itself in electrically. This operation of R1 altered the circuits as follows: It isolated "shaker on" solenoid S11, "shaker up" solenoid S9, relay R2, "carriage forward" circuit of motor 6M, and normal circuit to "unclamp" solenoid S13. It made up circuit changes as follows: Provided a new path of energy to "unclamp" solenoid S13 and "discharge belts in" solenoid S4 through LS12, and to "unlock" solenoid S1 through LS15 and LS2. With these alterations the clamp assembly remains closed after the first jointing operation and indexes two quarter turns to its final position where the clamp jaws are released leaving the bundle ready for ejection and with its trailing edge jointed, and if desired, glued.

During alternate single edge jointing ratchet relay RR4 is operated by LS23 once at the end of each three hundred sixty degrees of rotation of the clamping assembly. The contacts of RR4, however, are alternately opened and closed and are maintained thus until the next operation. The pilot light PL, hereinbefore mentioned, is controlled by the contacts of RR4 and will go on and off during operation but is arranged so that it must be on at the beginning of the first cycle. The closure of PB2 or PB2A at the beginning of the second cycle will operate the "unlock solenoid" S1 and "discharge belts out" solenoid S3 and also relay R3 through now closed contact of RR4.

The operation of R3 alters the circuit to R1, as hereinbefore described. In addition the operation of relay R3 further alters the circuits as follows: It shunts the contact of R1 in the circuit of "unclamp" solenoid S13 to allow unclamping, it isolates "discharge belts in" solenoid S4 by opening R1 shunt circuit around LS19, it makes up a circuit between LS5 and "clamp" solenoid S12 to allow clamping of the jaws in vertical positions without carriage travel. The operation of R3 also shifts R1 and R3 holding circuit from LS27 to LS23. With the alterations just described the jointer operates as follows: The clamping assembly indexes ninety degrees, clamps, indexes a second ninety degrees, unclamps, indexes a third ninety degrees where the shaker mechanism operates and the carriage returns and the jaws clamp the bundle, indexes a fourth ninety degrees where the carriage makes its jointing run, the jaws unclamp, and the discharge belts move in ready to receive the bundle which has had its leading edge jointed and glued, if the glue applicator is in operation. During this cycle LS2 is operated when the second indexing movement takes place dropping out R1 and R3 to restore the circuit to normal and operating RR4 to properly set its contacts for the next single edge jointing operation.

The foregoing description and accompanying drawings clearly disclose a preferred embodiment of this invention but it will be understood that changes in the same may be made within the scope of the following claims.

We claim:

1. In a machine for jointing the edges of long thin flat veneer sheets, two relatively movable long flat jaws capable of receiving therebetween a stack of veneer sheets with the sheets loosely held in substantially horizontal superposed relation; jaw indexing and holding device providing rotative indexing movements of said jaws in rotatively moving the veneer sheets between a position in which the sheets are substantially horizontal and a position in which said sheets are substantially vertical while the sheets are loosely retained between the jaws; and a transverse flexible belt supported beneath and close to the jaws receiving and supporting and moving with the veneer sheets during the indexing movement.

2. In a machine for jointing the edges of long thin flat veneer sheets, two relatively movable long flat jaws capable of receiving therebetween a stack of veneer sheets with the sheets loosely held in substantially horizontal superposed relation and extending lengthwise of the jaws; jaw indexing and holding devices providing rotative indexing movements of said jaws in rotatively moving the veneer sheets between a horizontal and a vertical position while said sheets are loosely held between the jaws; a flexible belt supported beneath the jaws transversely of the jaws and in the path of movement of the edges of the jaws, said belt supporting and moving with the edges of the veneer sheets during the indexing movement; and adjustable belt tensioning means releasably holding said belt in supporting relation to the edges of the veneer sheets, said belt when released by said tensioning means being clear of the edges of said veneer sheets.

3. In a machine for jointing the edges of long thin veneer sheets, two relatively movable long flat clamp jaws capable of receiving therebetween a stack of veneer sheets with the sheets loosely supported in superposed relation; jaw indexing and holding devices providing rotative indexing movements of said jaws in rotatively moving the veneer sheets from a horizontal to a vertical position while the sheets are loosely retained between the jaws; shaker means positioned adjacent to and beneath said jaws capable of receiving the edges of loosely held veneer sheets and supporting and shaking the sheets; a flexible endless veneer supporting belt movable with the jaws and positioned beneath the jaws crosswise of said jaws close to said jaws; and adjustable belt carrying means capable of selectively tensioning said belt into a veneer supporting position during the indexing movement and of slackening said belt clear of the veneer sheets, whereby the edges of said sheets rest on the shaker means after completion of the indexing movement.

4. In a machine for jointing the edges of long thin veneer sheets, two spaced apart end plates supported for rotative movement on a common horizontal axis; a long flat clamp jaw fixed to said end plates and extending therebetween; a long flat movable clamp jaw disposed between said end plates in opposed relation to said fixed clamp jaw; means supporting said movable clamp jaw for movement toward and away from said fixed jaw; jaw moving means connected with said movable jaw, said two jaws being capable of receiving therebetween a stack of long thin veneer sheets with the sheets disposed in horizontal superposed relation and extending lengthwise of the jaws; jaw indexing and holding devices providing rotative indexing movements of said jaws in rotatively moving the veneer sheets between a horizontal and a vertical position while the sheets are loosely retained between the jaws; a non-driven flexible belt extending across said jaws beneath said jaws in contact with said jaws and movable along with said jaws, said belt supporting the edges of the veneer sheets during their indexing movement; and releasable belt tensioning means connected with said belt.

5. In a machine for jointing the edges of bundles of long thin flat sheets of material, two spaced apart end plates supported for rotative indexing movement on a common axis; a long fixed clamp jaw extending between said end plates and rigid with said end plates; a long movable clamp jaw disposed between said end plates in opposed relation to said fixed clamp jaw; means rigid with said fixed jaw supporting said movable jaw for clamping movement toward and away from said fixed jaw; jaw moving means carried by said movable jaw capable of moving said movable jaw in clamping and unclamping a bundle of material between said jaws; and a driven jointer head movable longitudinally alongside of said jaws capable of jointing edges of the bundles held by said jaws.

6. In a machine for jointing the edges of long thin flat veneer sheets, two spaced apart end plates supported for rotative indexing movement on a common axis; a long fixed clamp jaw extending between said end plates and rigid with said end plates; a long movable clamp jaw disposed between said end plates in opposed relation to said fixed clamp jaw; means rigid with said fixed jaw movably supporting said movable jaw; pneumatic cylinder and piston means carried by said movable jaw capable of moving said movable jaw toward and away from said fixed jaw in clamping and unclamping a bundle; and a driven jointer head movable longitudinally alongside of said jaws capable of jointing edges of a bundle held by said jaws.

7. In a machine for jointing the edges of bundles of veneer sheets, two spaced apart end plates supported for rotative indexing movement on a common axis; a long fixed clamp jaw extending between said end plates and rigid with said end plates; a long movable clamp jaw disposed between said end plates in opposed relation to said fixed clamp jaw; means rigid with said fixed jaw supporting said movable jaw for clamping movement toward and away from said fixed jaw; jaw moving means capable of moving said movable jaw in clamping and unclamping a bundle of material between said jaws; indexing means capable of imparting successive steps of rotary indexing movement to said end plates and jaws; transverse inner belts carried by said fixed jaw positioned to receive and support the bundles; belt driving means connected with said inner belts and carried by said fixed jaw; and a driven jointer head movable longitudinally alongside of said jaws capable of jointing edges of bundles held therein.

8. In a machine for jointing the edges of bundles of veneer sheets, two spaced apart end plates supported for rotative indexing movement on a common horizontal axis; a fixed clamp jaw extending between said end plates and rigid with said end plates; a movable clamp jaw disposed between said end plates in opposed relation to said fixed clamp jaw; two perpendicular posts rigid with each end portion of said fixed jaw supporting and guiding the movable jaw for clamping movement toward and away from the fixed jaw; a gear rack rigid with each post; a cross shaft journaled in the end portion of the movable jaw adjacent each two posts; pinions on the cross shafts meshing with the gear racks on the posts; cross shaft rotating means carried by the movable jaw and connected with the cross shafts capable of rotating the cross shafts and imparting clamping movement to the movable jaw; indexing means capable of imparting successive steps of rotary indexing movement to said end plates and jaws; and driven jointer head means longitudinally movable alongside of said jaws.

9. In a machine for jointing the edges of bundles of veneer sheets, two spaced apart end plates supported for rotative indexing movement on a common horizontal axis; a fixed clamping jaw extending between said end plates and rigid with said end plates; a movable clamping jaw disposed between said end plates in opposed relation to said fixed jaw; two perpendicular posts rigid with each end portion of said fixed jaw supporting and guiding the movable jaw for clamping movement toward and away from the fixed jaw; a gear rack rigid with each post; a cross shaft journaled in the movable jaw adjacent each two posts; pinions on the cross shafts meshing with the gear racks on the posts; pneumatic cylinder and piston means carried by the movable jaw; a sprocket wheel on each cross shaft; devices including sprocket chain means connecting each sprocket wheel with said cylinder and piston means providing rotation of said cross shafts in imparting clamping movement to the movable jaw; indexing means capable of imparting successive steps of rotary indexing movement to said end plates and jaws; and driven jointer head means longitudinally movable alongside of said jaws.

10. In a machine for jointing the edges of bundles of veneer sheets, a bundle clamping assembly mounted for rotary indexing movement and having an end plate; an indexing member mounted for oscillating movement adjacent to and coaxially of said end plate; means carried by said indexing member capable of selectively engaging and releasing said end plate and imparting successive indexing movements in one direction to said bundle clamping assembly; a crank mounting shaft supported for oscillation; a crank rigid with said shaft; a link connecting said indexing member and said crank; a gear pinion rigid with said shaft; pneumatic cylinder and piston means connected with said gear rack capable of reciprocating said gear rack and oscillating said shaft and crank and indexing member; and hydraulic speed control means connected with said gear rack controlled by oscillating movement of said shaft and compelling progressively increasing deceleration of said bundle clamping assembly as it approaches the end of its indexing movement.

11. In a machine for jointing the edges of bundles of veneer sheets, a bundle clamping assembly mounted for rotary indexing movement and having an end plate; an indexing member mounted for oscillating movement adjacent to and coaxially of said end plate; means carried by said indexing member capable of selectively engaging and releasing said end plate and indexing said bundle clamping assembly step by step in one direction; a crank mounting shaft supported for oscillation; a crank rigid with said shaft; a link connecting said indexing member and said crank; a gear pinion rigid with said shaft; a gear rack engaging said pinion; and gear rack moving means comprising a pneumatic cylinder and a hydraulic cylinder, a piston rod common to both of said cylinders and connected with said gear rack, two pistons in the respective cylinders rigid with said piston rod, air pressure supply means connected with said pneumatic cylinders whereby said piston rod and gear rack can be reciprocably moved and said shaft and crank and indexing means oscillated, an annular tapered groove in said shaft, a fixed sleeve on said shaft embracing said groove, and two conduits connecting angularly spaced apart points of said sleeve at the location of said groove with opposite end portions of said hydraulic cylinder, the tapered groove in said shaft cooperating in forming a by-pass of variable area between the two ends of said hydraulic cylinder, whereby progressively increasing resistance to each indexing movement of said bundle clamping assembly is provided near the end of each indexing movement.

12. The apparatus as claimed in claim 11 in which one of said conduits is communicatively connected with a liquid reservoir providing quick return movement of said indexing member.

13. In a machine for jointing alternate edges of bundles of long thin veneer sheets, a long bundle clamping assembly mounted for rotary indexing movement on a longitudinal horizontal axis and having two bundle clamping jaws relatively movable toward and away from each other to clamp and unclamp a bundle, said assembly having a loading position in which the faces of the jaws and the sheets of veneer in the bundles loaded thereinto are horizontal; driven jointer means movable lengthwise alongside of said bundle clamping assembly capable of normally jointing the edges of sheets of a bundle clamped between the jaws of said assembly and protruding therefrom when the jaws and clamped sheets of a bundle are in a horizontal position; means capable of imparting to said bundle clamping assembly successive ninety degree indexing movements in the same direction, whereby one edge of the bundle will be presented for jointing at the end of the second indexing movement and the other edge of said bundle will be presented for jointing at the end of the fourth indexing movement; and electrically governed means selectively controlling the travel of said jointer providing operation of said jointer at the end of each second indexing movement and holding said jointer non-movable at the end of each fourth indexing movement.

14. In a machine for jointing alternate edges of successive bundles of long thin veneer sheets, a relatively long bundle clamping assembly mounted for rotary indexing movement on a longitudinal horizontal axis and having two bundle clamping jaws relatively movable toward and away from each other to clamp and unclamp a bundle, said assembly having a loading position in which the bundle engaging faces of the jaws and the sheets of veneer in the bundles loaded thereinto are horizontal; driven jointer means movable lengthwise of said bundle clamping assembly capable of jointing the edges of sheets of a bundle clamped between the jaws of said assembly and protruding therefrom when the jaws and the clamped sheets are in a horizontal position; means capable of imparting to said bundle clamping assembly successive ninety degree rotary indexing movements in the same direction, whereby first one edge and then the other edge of a bundle of horizontally supported sheets is positioned for engagement by the jointer; and automatic electric jointer control means governing movement of said jointer providing jointing of alternate edges of successive bundles carried by said bundle clamp assembly.

15. In a machine for jointing the edges of bundles of veneer sheets, a bundle clamping assembly mounted for rotary indexing movement on a longitudinally extending horizontal axis and having two bundle clamping jaws relatively movable toward and away from each other to clamp and unclamp a bundle, said assembly having a loading position in which the bundle engaging faces of the jaws and the sheets of veneer in the bundles loaded thereinto are horizontal; driven jointer means movable lengthwise of said bundle clamping assembly capable of jointing the edges of sheets of a bundle clamped between the jaws of said assembly and protruding therefrom when the jaws and the clamped sheets of the bundle are in a horizontal position; means capable of imparting to said bundle clamping assembly successive ninety degree indexing movements in the same direction, whereby one edge of the bundle will be presented for jointing at the end of the second indexing movement and the other edge will be presented for jointing at the end of the fourth indexing movement; and electrically governed means controlling the travel of said jointer providing jointing travel thereof each alternate time a bundle of clamped sheets is presented at the end of the second indexing movement and at the end of the fourth indexing movement, whereby bundles released after the fourth indexing movement will have alternate edges jointed.

16. In a machine for jointing the edges of bundles of veneer sheets, a bundle clamping assembly mounted for rotary indexing movement on a longitudinally extending horizontal axis, said assembly including two bundle clamping jaws movable toward and away from each other between a veneer clamping position and a veneer unclamping position; a plurality of transverse recesses extending across the veneer clamping face of at least one of said jaws; a belt skid member disposed in each transverse recess; compression springs in the bottom of the recess supporting the belt skid member permitting movement of the member into the recess by pressure; a transverse veneer engaging endless driven inner belt having one lap thereof supported on and movable along each belt skid, the lap of the belt on each belt skid being yieldable to pressure of veneer between the jaws when said jaws are in veneer clamping position and being capable of moving veneer transversely of said jaws when said jaws are in veneer unclamping position.

17. In a machine for jointing the edges of bundles of veneer strips, a discharge belt assembly comprising a base frame; two spaced apart parallel horizontal shafts supported in said base frame; upwardly extending skid supporting bars rigidly secured to each shaft; belt skids pivoted to the upper ends of said bars, each belt skid being supported by two bars which are parallel to each other; an endless driven belt carried by each belt skid; pneumatic cylinder and piston means connected with at least one of said bars capable of swingingly moving all of said bars and the belt skids carried thereby from one side to the other of a position in which the bars are vertical; an air pressure supply conduit; a reversible air control valve connected with said air pressure supply conduit; two air inlet and exhaust conduits respectively connecting said air control valve with the opposite ends of said cylinder; a check valve in each of said air inlet and exhaust conduits, said check valve being open to a free inlet of air to said cylinder and closed to exhaust of air from said cylinder; and two sets of by-pass conduits respectively providing by-pass passageways for exhaust air from opposite ends of said cylinder around said check valves, each set of by-pass conduits including air flow governing means operated by rotary movement of one of said shafts providing free exhaust of air at the start of movement in one direction of the discharge assembly and providing increasing resistance to the escape of exhausting air with a gradual decrease in the speed of movement of the assembly as said assembly approaches the end of its movement in that direction.

References Cited in the file of this patent

UNITED STATES PATENTS

| | | |
|---|---|---|
| 1,853,554 | Dennis | Apr. 12, 1932 |
| 2,273,653 | Melby | Feb. 17, 1942 |
| 2,712,840 | Gilbertson | July 12, 1955 |
| 2,830,629 | Deiters | Apr. 15, 1958 |
| 2,834,384 | Pearl | May 13, 1958 |
| 2,851,070 | Hughes | Sept. 9, 1958 |